April 7, 1970   G. A. REESE ET AL   3,505,472
FACSIMILE SYNCHRONIZING SYSTEM
Filed Jan. 12, 1966   9 Sheets-Sheet 3

INVENTORS:
Glenn A. Reese
Paul J. Crane

By Smyth, Roston & Pavitt
Attorneys

April 7, 1970  G. A. REESE ET AL  3,505,472
FACSIMILE SYNCHRONIZING SYSTEM
Filed Jan. 12, 1966  9 Sheets-Sheet 4

INVENTORS
Glenn A. Reese
Paul J. Crane

Attorneys

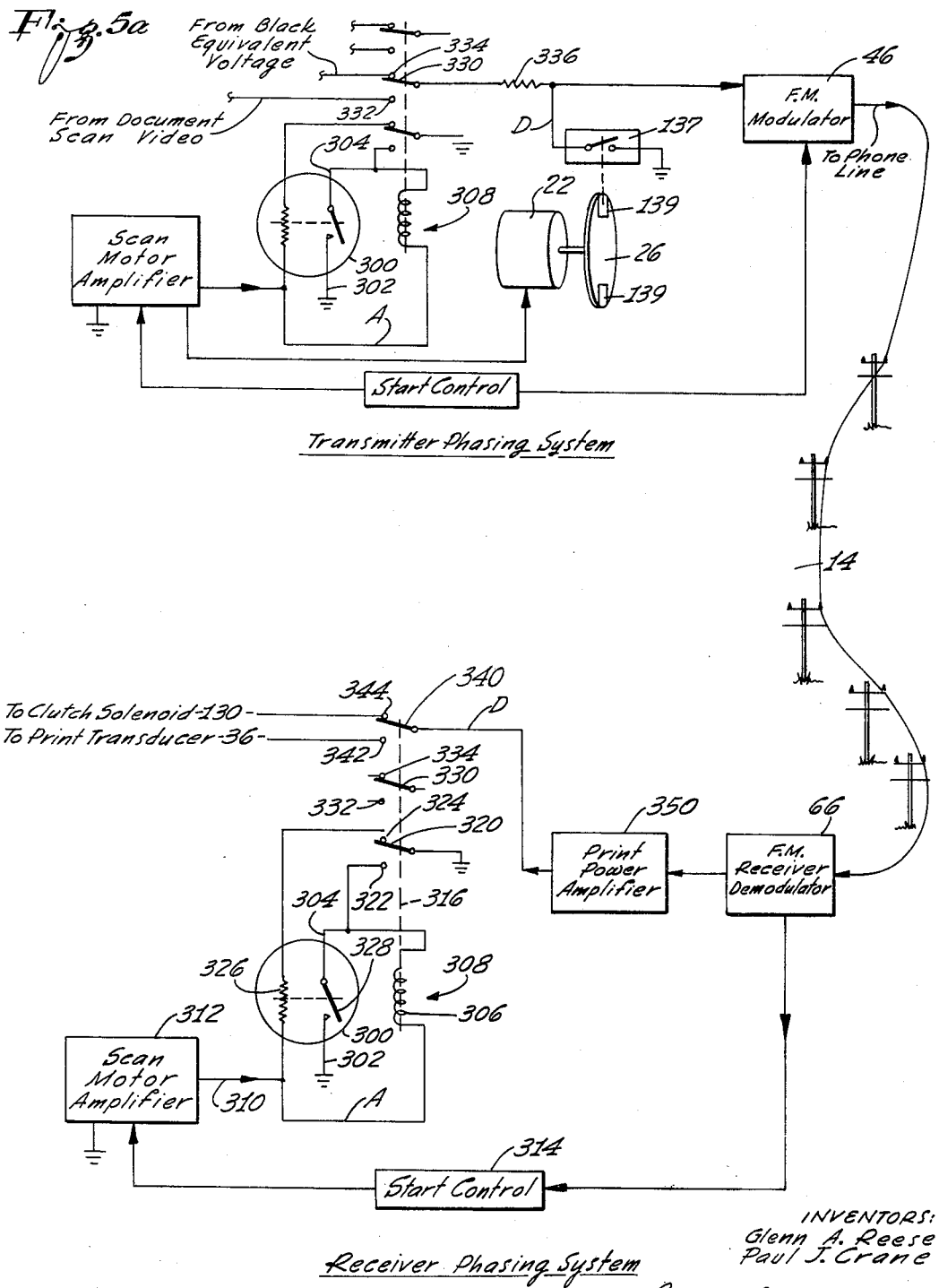

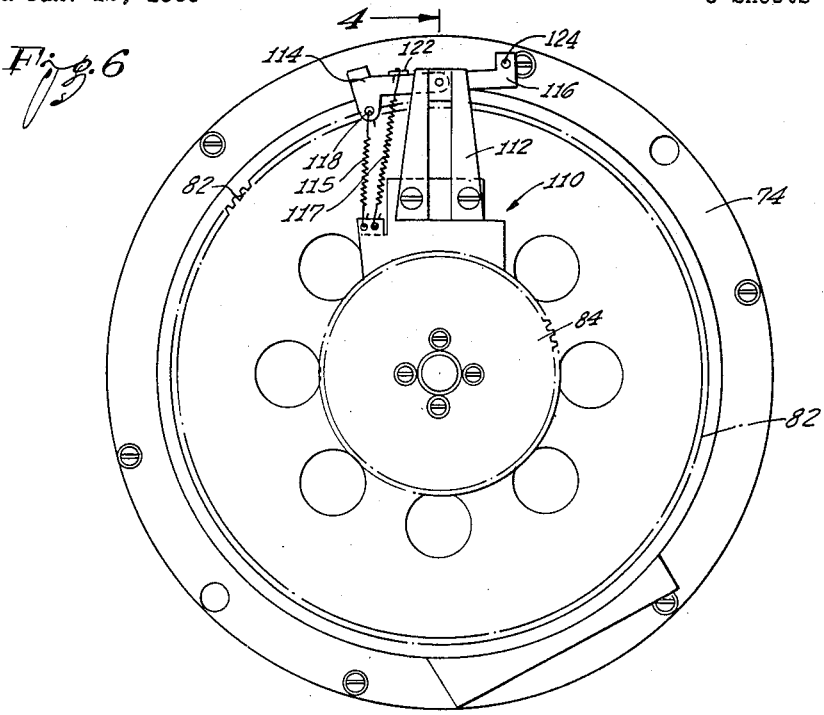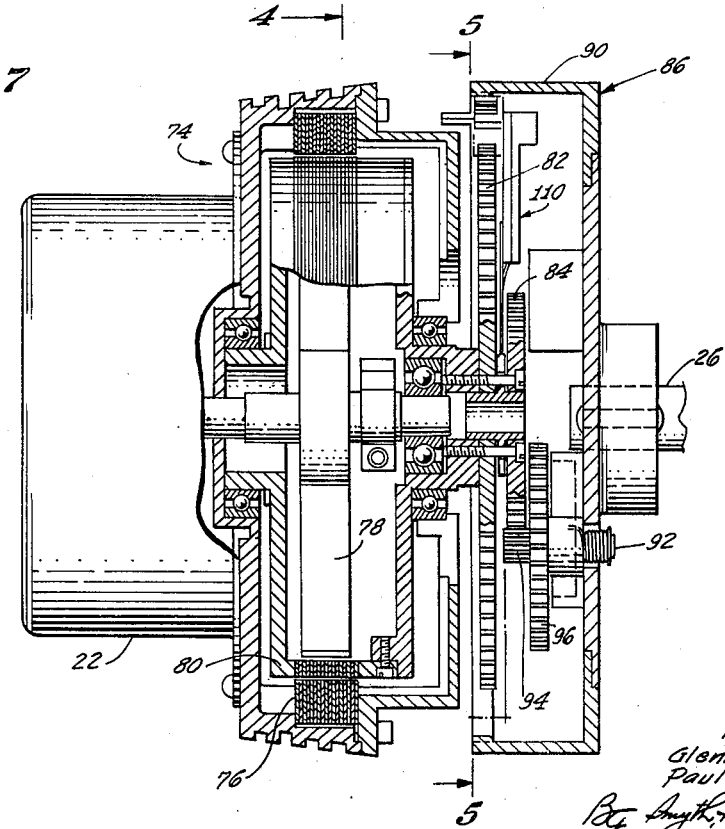

INVENTORS:
Glenn A. Reese
Paul J. Crane

Attorneys

INVENTORS:
Glenn A. Reese
Paul J. Crane

Attorneys

United States Patent Office 3,505,472
Patented Apr. 7, 1970

3,505,472
FACSIMILE SYNCHRONIZING SYSTEM
Glenn A. Reese, San Pedro, and Paul J. Crane, Torrance,
Calif., assignors to The Magnavox Company, Torrance,
Calif., a corporation of Delaware
Filed Jan. 12, 1966, Ser. No. 520,269
Int. Cl. H04n 1/36
U.S. Cl. 178—69.5                   30 Claims

ABSTRACT OF THE DISCLOSURE

This invention relates to a system for synchronizing the operation of a facsimile system at a receiver with a facsimile system at a transmitter. The system operates to provide this synchronization within a limited period of time such as approximately 20 seconds. At the end of this limited period of time, the facsimile transmitter and the facsimile receiver become automatically set so that the synchronizing operations become interrupted and facsimile information is transmitted.

The facsimile transmitter and the facsimile receiver have rotary transducers. During the time that synchronization is being attained between the operation of the facsimile transmitter and the facsimile receiver, the transducer at the receiver is rotated at a slightly slower speed than the transducer at the transmitter. When synchronization is attained, the transducer at the receiver becomes locked to a synchronous motor.

---

The present invention relates to synchronizing means and more particularly to means for phase-synchronizing the rotary motion of two or more rotating devices. For purposes of illustration, the invention will be discussed in connection with the phase synchronization of the operation of a receiving unit in a facsimile system with the operation of a transmitting unit in a facsimile system, but the invention has application over the entire range of synchronization problems.

In the above-mentioned example of a facsimile system for transmitting video signals from a first location to a second or remote location for producing a printed facsimile, it is necessary for the receiving unit to be synchronized with the transmitting unit so that the print-out transducers will mark the same place in the copy paper that the read-transducer is scanning on the original. One facsimile system for remotely reproducing documents such as letters, drawings, or blueprints is disclosed and claimed in copending application, Serial No. 669,315 filed Sept. 20, 1967 on behalf of Glenn A. Reese and Paul J. Crane entitled "Facsimile Systems," which in turn is a continuation of application Ser. No. 549,759 (now abandoned) filed Apr. 21, 1966 and entitled "Facsimile Systems," which in turn is a continuation of application Ser. No. 176,248 (now abandoned) filed Feb. 28, 1962 and entitled "Facsimile System." All the video signals produced in the facsimile system are in a very low-frequency band whereby they may be transmitted through conventional telephone transmission lines. The system employs a "transceiver" set that may be operated either as a transmitter or as a receiver.

When the transceiver unit is operating in its transmit mode, pickup transducers mounted on a rotating structure optically scan the original document and generate representative video signals. Video electrical signals are then coupled into a conventional telephone handset or in some other manner fed to conventional telephone lines for transmission to another transceiver set operating in the receive mode, where they are decoupled from the conventional telephone transmission facilities and fed to printing transducers. The printing transducers are mounted on the same rotating structure as the pickup transducers and scan a blank piece of copy paper. The printing transducers are actuated by the electrical video signals from the transmitting unit to produce a facsimile or reproduction of the original document on the copy paper.

To ensure a faithful reproduction, the revolving structures in the transmitting and receiving units must be closely synchronized with each other. In the transceiver unit disclosed and claimed in the above-cited copending application, Ser. No. 669,315, the rotating structures are interconnected with the drive motors by means of a synchronizing drive. The total drive train interconnecting the motor with the rotating structure in Ser. No. 669,315 includes gear reducing means, a clutch for disengaging the motor during starting, and a lost motion connection. The clutch may be of any suitable variety but is preferably adapted to engage instantly without slippage. Although synchronizing means of the foregoing variety are effective to accomplish the desired synchronizing operation, it has been found that they do have certain limitations. The accuracy of the synchronization is dependent upon an accurate indexing of the lightweight rotors prior to the starting operation. After the rotating structures carrying the transducers in both the transmitting and receiving units have been accelerated to operating speed, there is no way of finding out whether the transmitting and receiving structures are locked in proper phase relation with each other. Also, there are no means to correct any phase error that may have occurred if the rotating structures in one or both of the units somehow become displaced timewise. It will thus be seen that although the foregoing facsimile system is capable of adequately performing its intended funtcion, it could be improved in its precision capabilities if only more accurate synchronization could be developed beyond the above-described limitations.

One well-known method for attaining phase orientation of a synchronous motor output shaft with some reference rotation includes the steps of first sampling and comparing the phase orientation of the synchronous motor and the reference rotation, then blanking the electrical input signal to the synchronous motor to cause its rotor to slip one pole on the stator, i.e., to drop back at the time when the normal AC signal to the motor is blanked.

This comparison and pole-slipping procedure has the drawbacks or limitations that it is no more accurate than the number of poles set up on the standing field of the synchronous motor stator. Thus, a commonly-used 40-pole synchronous motor would be accurate only to $\frac{1}{40}$ of a revolution, whereas the phase orientation means according to the invention to be disclosed herein is accurate to $\frac{1}{250}$. Another drawback of the comparison and slippage method is that since the usual sampling device (such as a rotating magnet and a fixed pickup) can make only one comparison per revolution, the motor can only shift by one pole per revolution. Thus if the motor started up almost 360 degrees out of phase it would have to slip almost 40 poles and require therefor the time of 40 revolutions to achieve even the limited accuracy that it is capable of. On the other hand, the invention to be disclosed herein can usually achieve $\frac{1}{250}$ accuracy phase orientation in less than one revolution; and rarely is more than about three seconds of "hunting" required. Moreover, the pole-slippage operation introduces small and unmanageable errors into the orientation of a synchronous motor, so that accuracy is really even less than the $\frac{1}{40}$ or whatever represented by the number of poles of the motor.

The present invention provides means for synchronizing two or more devices without the disadvantages or limitations presented by the above-discussed prior art. The means are particularly adapted for accelerating a pair of rotating structures such as are employed in facsimile transmitting and receiving units up to their operating speeds and locking them in synchronous operation.

More particularly, the present invention comprehends a facsimile transceiver that may operate in either a transmit mode or a receive mode. When the transceiver is ready to operate in a transmit mode, it initially passes through a synchronizing phase during which it transmits a reference or synchronizing signal that is responsive to the position of the pickup transducers. The receiving unit passes through a synchronizing phase at the same time as the transmitting unit. During this phase, it is responsive to the reference or synchronizing signal and repeatedly repositions the reproducing transducers until they are accurately synchronized with the transmitting transducers and remain synchronized therewith.

In one operative embodiment of the present invention, this is accomplished by providing the transceiver with a synchronizing clutch having two separate drive paths. One path drives the printing transducers at the synchronous reproducing speed while the other path drives the printing transducers at a slightly slower speed whereby the phase relation of the printing transducers will gradually change. A solenoid-controlled actuator in the clutch selects which of the drive paths is operative. The solenoid is responsive to the synchronizing signals from the transmitting unit and repositions the reference pawl each time a synchronizing signal is received if the reference pawl is not already disposed in the synchronized position. Each time the reference pawl is repositioned into the synchronized position it will allow the printing transducer to run at the non-synchronized speed until it also reaches a synchronized position. When the printing transducers do reach the synchronized position, the reference pawl will cause the clutch to commence driving the printing transducers at the synchronized speed so as to be ready for producing a facsimile. Throughout the synchronizing phase, the actuator will be continuously responsive to the synchronizing signal; and if for some reason the printing transducers are not initially properly synchronized, they will be continually repositioned until they do become properly synchronized and remain synchronized.

These and other features and advantages of the present invention will become more apparent from the following detailed description of one operative embodiment of the present invention particularly when taken in connection with the accompanying drawings wherein like reference numerals refer to like parts and wherein:

FIGURE 5(a) is a block diagram of an electrical system according to certain principles of the instant invention;

FIGURE 6 is a front view of a second embodiment of the instant invention;

FIGURE 7 is a side elevation partly in section of a drive clutch assembly in which the principles of the invention are applied as an improvement;

Figure 3:
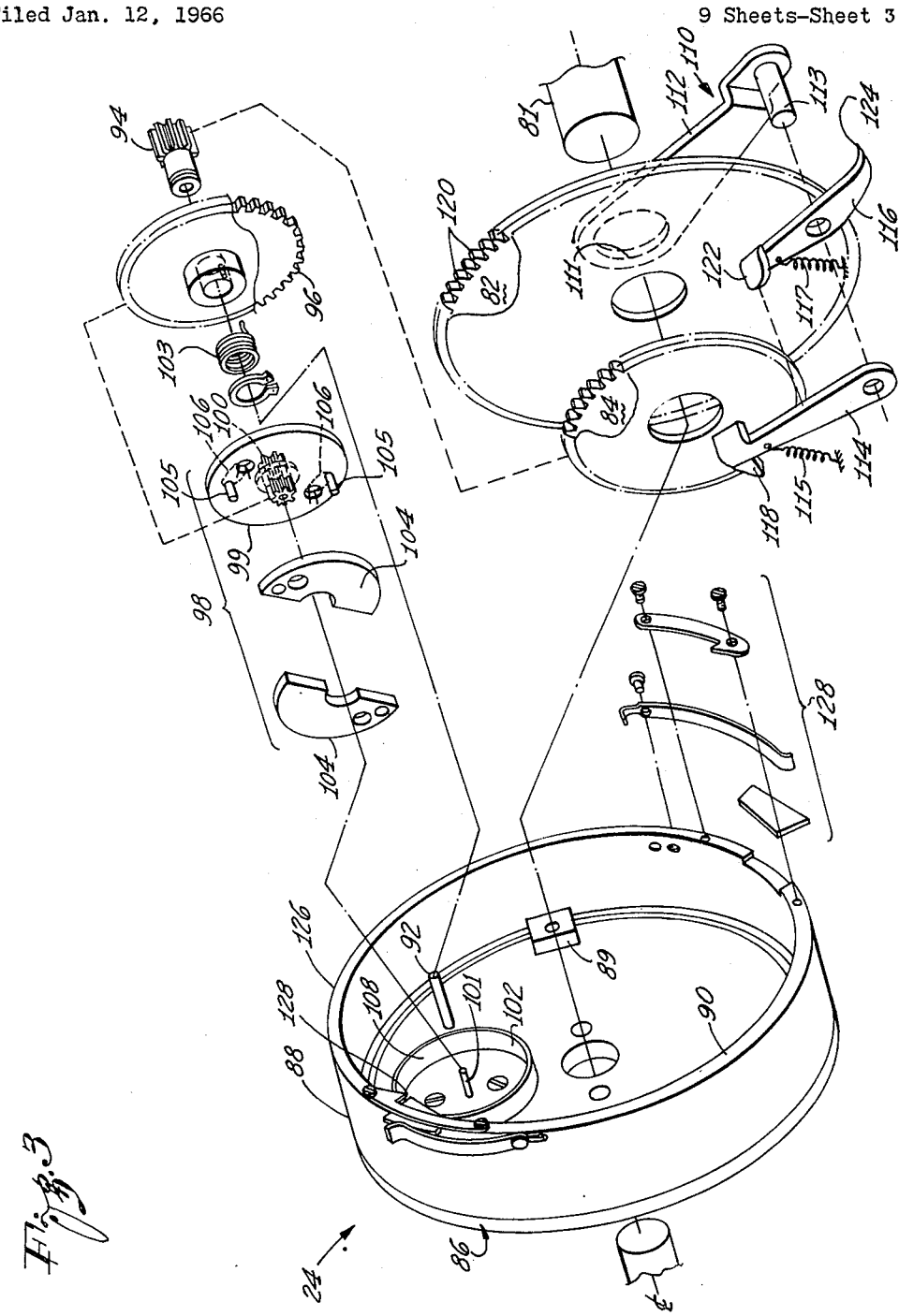
FIGURE 3 is an exploded view of a first embodiment of the principles of the instant invention.
Figure 12:
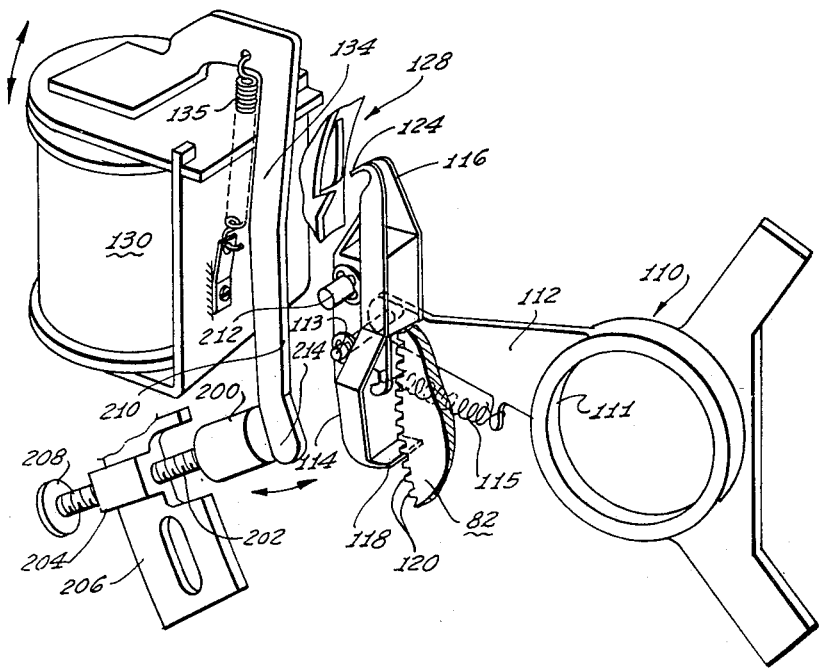
Figure 13:
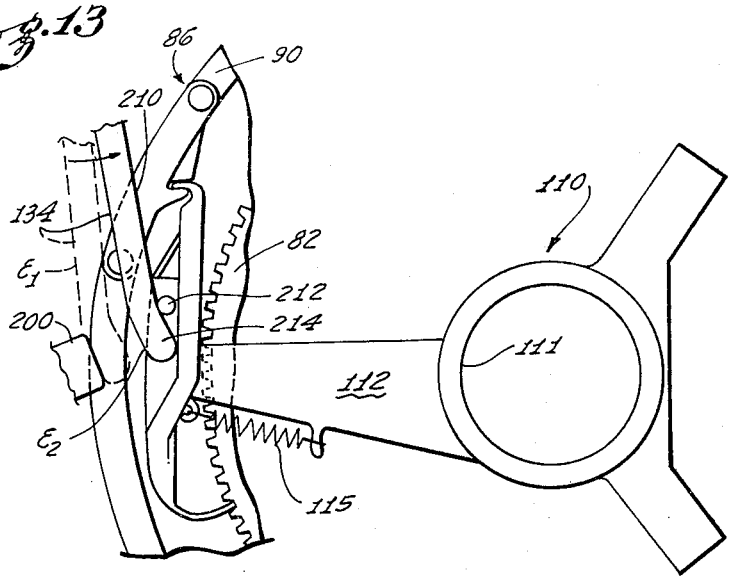

FIGURES 11(a) and 11(b) are detailed views of a front elevation in detail of a portion of FIGURE 6;

FIGURE 12 is a perspective view in detail of a portion of the embodiment of FIGURE 3; and FIGURE 13 is a front elevation in detail of a portion of FIGURE 12.

Figure 1:
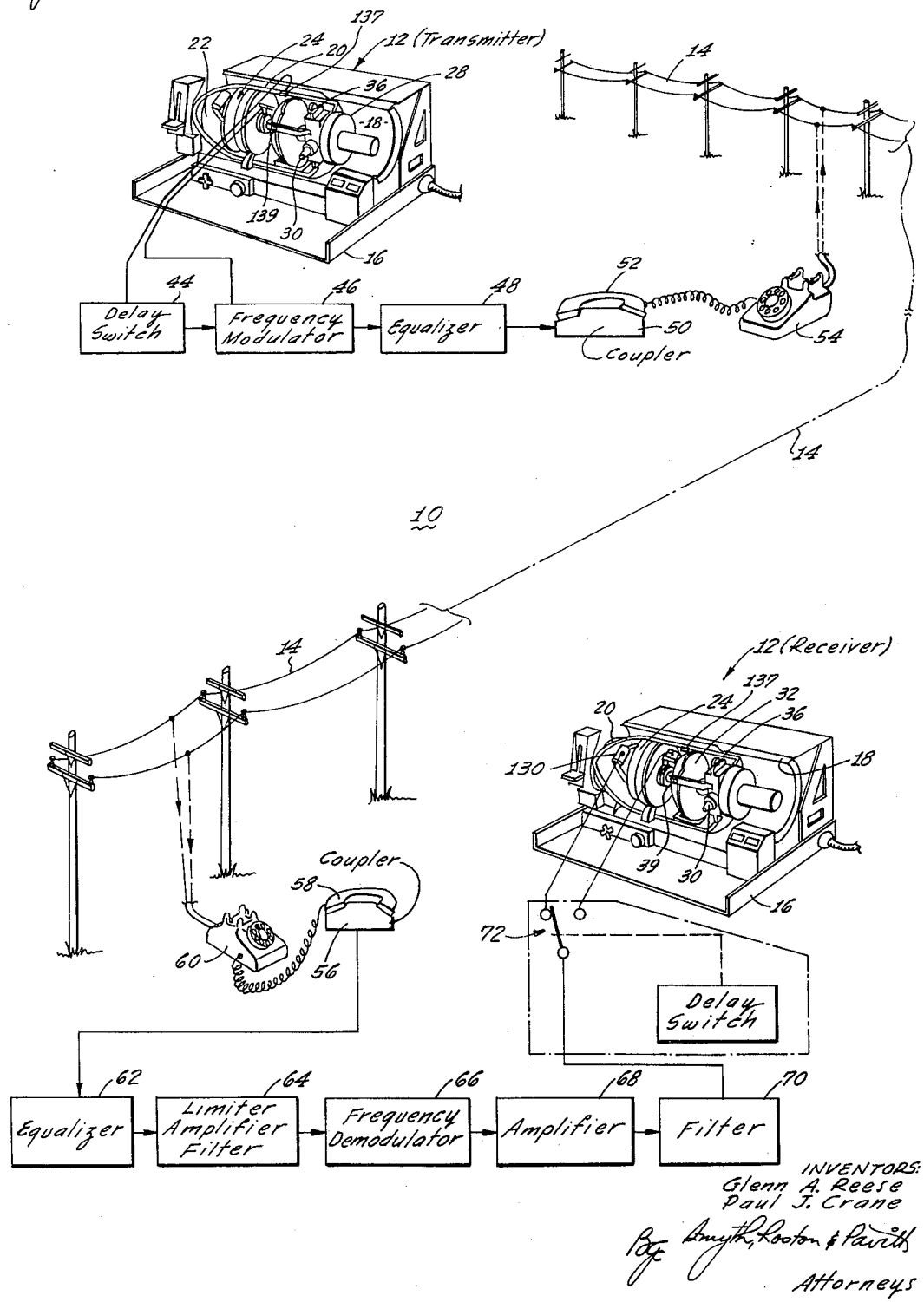
FIGURE 1 is a combination block diagram and perspective view of a facsimile system embodying one form of the present invention.
Figure 2:
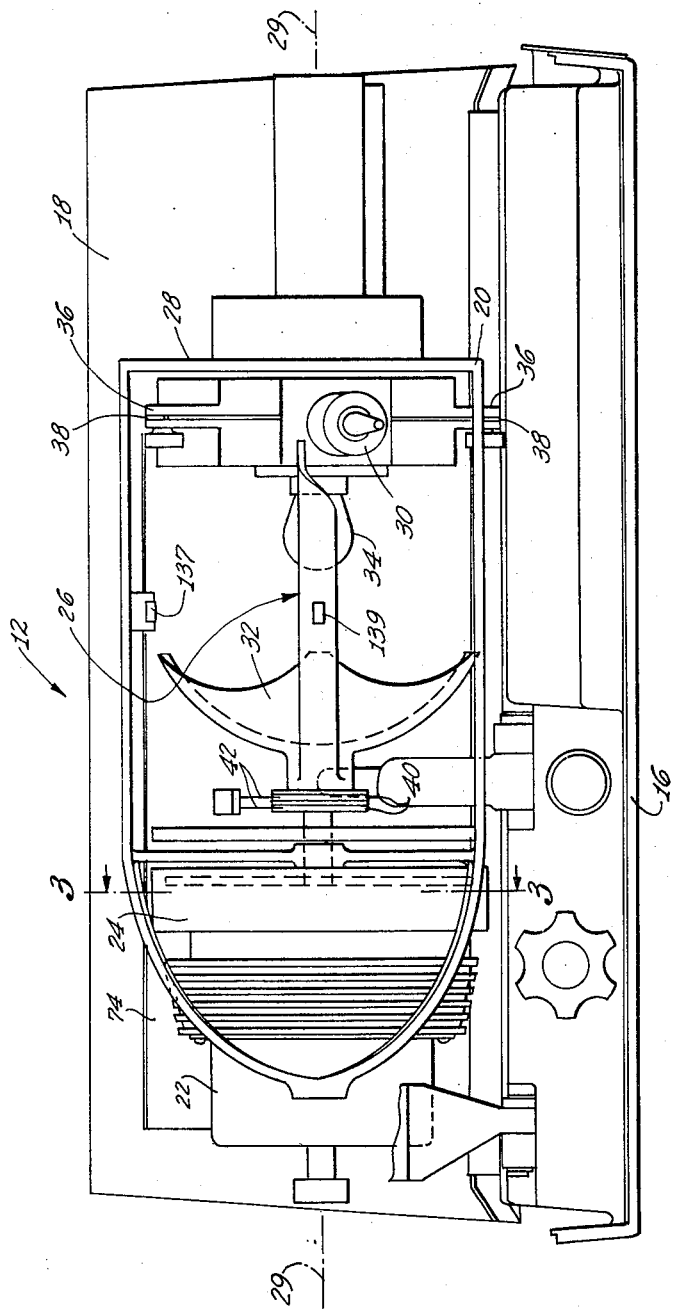
FIGURE 2 is a front view of a transceiver employed in the system of FIGURE 1.

Referring to the drawings in more detail and especially to FIGURES 1 and 2, the present invention is embodied in a facsimile system 10 for producing facsimiles of original documents such as letters, photographs, drawings, or blueprints. Although the facsimile system 10 may employ any type of transmission line, it is particularly adapted for transmitting the facsimile or video signals over a conventional telephone transmission line 14. It has been found that transmission line 14 of this type normally have very narrow band widths and are not well suited for transmitting video signals. For example, due to the fact that they are designed mainly for voice transmission the transmission lines 14 have a large amount of "roll-off" and phase distortion as the frequency rises above about 2500 cycles per second.

The facsimile system 10 employs a transceiver 12 which may be operated in a transmit mode for generating and transmitting the video signals or may be operated in a receive mode for receiving the video signals and reproducing a facsimile of the original document. The transceiver 12 may be substantially identical to that disclosed and claimed in copending application, Ser. No. 494,053 filed Oct. 8, 1965, in the names of Glenn A. Reese and Gustavus B. Pearson, entitled "Facsimile Transceiver."

The transceiver 12 includes a base 16 upon which the various operating portions are mounted. A semicylindrical platen 18 is mounted on the base 16 so as to extend thereacross. When the transceiver 12 is operating in a transmit mode, the original document to be copied is placed on the platen 18 and fed axially therealong. When the transceiver 12 is operating in the receive mode, blank copypaper is placed on the platen 18 and advanced axially therealong in synchronism with the document in the transmitting unit.

The mechanically movable parts are mounted on a frame 20 positioned in front of the platen 18. These parts include a drive motor 22, a speed-reducing gear (not shown), a synchronizing clutch 24, and a rotating yoke 26. The yoke 26 is coupled to the motor 22 by the clutch 24 and is rotatably driven about an axis 29 that is substantially coaxial with the platen 18.

A pair of pickup transducers 30 are mounted on the diametrically opposite sides of the yoke 26 for scanning a document on the platen 18 as the yoke 26 rotates. The pickup transducers 30 may be of any type suitable for scanning the original document and producing a baseband video signal. However, it has been found desirable to use pickup transducers and a complementary optical system similar to that disclosed and claimed in copending application, Ser. No. 655,265 filed June 28, 1967 on behalf of Glenn A. Reese and Gustavus B. Pearson entitled "Optical Facsimile Scanning System" which in turn is a continuation-in-part of application Ser. No. 436,504 (now abandoned) filed Mar. 2, 1965 and entitled "Optical System." More particularly, each transducer 30 uses a photoelectric cell responsive to the amount of light reflected from the document. Partial ellipsoidal mirrors 32 focus light from a lamp 34 adjacent the center of the yoke 26 onto the document to form a bright spot of intense light on the document in the field of view of the photocells.

A pair of printing transducers 36 are also mounted on the diametrically opposite sides of the yoke 26. These transducers 36 are disposed at right angles to the pickup transducers 30 so as to scan a copypaper on the platen 18 90 degrees out-of-phase with the pickup transducers 30. The printing transducers 36 may be of any desired variety. By way of example, they may be similar to those disclosed and claimed in U.S. Patent No. 3,325,821 issued June 13, 1967 in the name of Glenn A. Reese and Donald H. Westermeir and entitled "Multispot Transducer." Each transducer 36 includes a stylus 38 that is effective to exert a pressure proportional to the amplitude of the signal supplied thereto. The stylus 38 rides on a presure-sensitive material such as an ink ribbon or carbon paper overlaying the copypaper so as to produce a mark thereon proportion to the signal.

The transducers 36 are electrically connected to slip rings 40 that rotate with the yoke 26 and are contacted by a plurality of brushes 42 while the transducers 30 are optically connected to a stationary photoelectric cell. The brushes 42 and the photocell are, in turn, connected to a system such as the frequency modulation system disclosed and claimed in copending application, Ser. No. 458,954, filed May 26, 1965, in the names of Rex J. Crookshanks and Glenn A. Reese, entitled "Facsimile Transmission System." When the transceiver 12 is operating in a transmit mode, the photoelectric cell is electrically connected to a frequency modulator 46. This modulator 46 is effective to frequency-modulate a carrier wave with the baseband signal produced by the pickup transducers 30. The modulated signal preferably is within a band width suitable for transmission over the conventional telephone transmission line 14. By way of example, the modulated signal may vary between about 800 cycles per second and about 3200 cycles per second.

It has been found desirable to employ an equalizer 48 having characteristics that will at least partially compensate for the frequency, phase and amplitude distortions which are normally produced in a conventional narrowband transmission line such as a long distance telephone line 14. A coupler 50 is interconnected with the output of the equalizer 48 for coupling the equalizer frequency-modulated signals onto a transmission line such as a conventional telephone transmission line 14.

When the transceiver 12 is operating in a received mode, a coupler 56, substantially identical to the coupler 50, acoustically decouples the frequency-modulated signals from the handset 58 of a conventional telephone 60. An equalizer 62, connected to the output of the coupler 56, augments the work of the equalizer 48 in the transmitting unit and more fully compensates for phase, frequency, amplitude, and other distortions which may be produced by the transmission line 14.

The output of the equalizer 62 may be interconnected with a combination limiter-amplifier-filter 64 that limits the amplitude of the signal to a constant amount and thereby removes any spurious amplitude modulation from the signal. It has been found that the phase distortions and amplitude "roll-off" in a conventional telephone transmission line becomes very pronounced above about 2500 c.p.s. and this produces a very substantial if not complete loss of the upper sidebands of the facsimile signal.

A frequency demodulator 66 is interconnected with the limiter-amplifier-filter 64 so as to demodulate the signal and recover the original signal produced by the pickup transducer 30, hereinafter referred to as the "baseband" signal. The frequency demodulator 66 is cascaded with a suitable amplifier 68 and a low-pass filter 70 that are effective to make the baseband signal more useful for driving the printing transducers 36. A two-pole switch 72 interconnects the filter 70 with the brushes 42 and slip rings 40 leading to the printing transducers 36 or to clutch solenoid 130. During normal operation, the switch 72 is set such that the printing transducers 36 will receive the baseband signal from the demodulator 66 for use in producing a facsimile of the original document, while during synchronization the solenoid 130 receives the baseband signal.

The driving motor 22 is necessarily of the synchronous type. Such a motor uses an AC input and runs at a constant speed that is precisely determined solely by the frequency of the driving power. Thus, if the driving power signals supplied to the transmitter motor 22 and the receiver motor 22 have the same frequency, the transducers 30 and 36 in both the transmit and receive units will rotate at the same angular velocity. However, to maintain the necessary registry between the facsimile printed by the receiver and the original document scanned by the transmitter, the rotational position with respect to the documents of the printing transducers 36 must be synchronized with the position of the pickup transducers 30. More particularly, each time a pickup transducer 30 initiates a scan across the document, a printing transducer 36 should initiate a corresponding scan across the blank paper.

During normal operation, the synchronizing clutches 24 in both the transmitting and receiving units will remain locked so that the yokes 26 in both the transmitting and receiving units will be running at synchronous speed. However, at the beginning of a transmission and prior to the commencement of normal operation, the principles of the instant invention contemplate that the synchronizing clutch 24 in the receiving unit will be actuated to vary the angular relationship of the yoke 26 in the receiving unit until the transmitting and receiving yokes 26 are synchronized.

Although any desired type of clutch 24 may be employed, it has been found that the synchronizing clutch of the instant invention and similar to that shown in the figures to follow is particularly well suited for this purpose. This clutch 24 is coupled to the drive motor 22 by a speed-reducing gear train 74. Although this gear train 74 may be of any desired variety, in the present instance it is a magnetic gear train similar to that disclosed and claimed in U.S. Patent No. 3,301,091 issued Jan. 31, 1967 and entitled "Magnetic Gearing Arrangement" in the name of Glenn A. Reese. This train 74 includes an outer stator 76, an input rotor 78 and an output rotor 80. The gear train 74 will reduce the speed of the motor 22 down to a synchronous speed on the order of 90 r.p.m.

Figure 4:
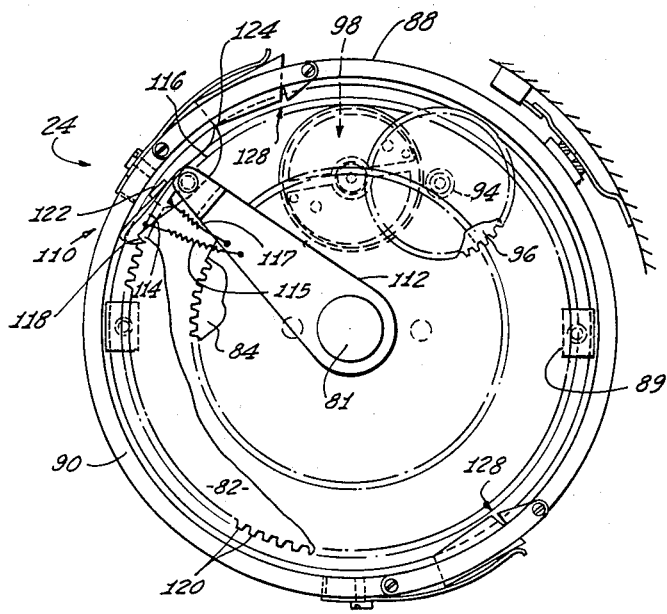
FIGURE 4 is a first elevation of the embodiment of FIGURE 3.

Within the clutch 24, as shown in FIGURES 3 and 4, a pair of drive gears 82 and 84 are secured directly to the output shaft 81 of the rotor 80 so as to rotate with the motor 22 but at the reduced synchronous speed. As one principle of the invention, the clutch 24 includes two separate drive paths, the first one being driven by the small gear 84 and the second one being driven by the large gear 82. The purpose of the first drive path is to accelerate the yoke 26 to an angular velocity just short of the angular velocity of the gears 82 and 84. The purpose of the second drive path is to take over from the first drive path after the yoke 26 has been accelerated as much as possible thereby and to accomplish precise velocity and phase synchronization of transmitter and receiver yokes 26.

Each of the drive paths ends by actuating a carrier 86 which is a disk or other structure mounted to rotate with the yoke 26. A cylindrical end wall 88 is held to the carrier 86 by a lug and screw arrangement 89 and extends sufficiently far forward from the carrier 86 to envelope the gears 84 and 82.

The first drive path includes a plurality of gears that are mounted on the carrier 86 so as to rotate therewith. A stub shaft 92 is secured to the end wall 88 and carries a pinion 94 that meshes with the small drive gear 84. A larger gear 96 is mounted on the stub shaft 92 and is connected to the pinion gear 94. These gears 94 and 96 are free to rotate about the axis of the stub shaft 92 without imposing enough torque to rotate the carrier 86.

A slipping clutch 98 is mounted on the carrier 86 and includes a main disk 99 having a small gear 100 that is mounted to rotate with the main disk 99 and meshes with the large gear 96 on the stub shaft 92. Although the slippage clutch 98 may be of any desired type in the present instance, it is of the so-called centrifugal-governed variety. More particularly, the clutch 98 includes stub shaft 101 and an outer housing 102 which are attached directly to the carrier 86.

A pair of centrifugal weights 104 are pivotally mounted on the main disk 99 inside the housing 102 and swing around mounted pins 105 under the urging of springs 106. The exterior surfaces of the weights 104 are substantially semicylindrical and are adapted to move into and out of contact with the cylindrical inner surface 108 of the housing 102. The spring means 106 normally bias the weights 104 radially inwardly to maintain the exterior of the weights 104 separated from the cylindrical surfaces 108. However, when the speed of rotation of the weights exceeds a predetermined amount, the centrifugal force of the rotating weights 104 will overcome the spring 106 tension and cause the exterior surface of the weights 104 to slidably engage the cylindrical surface 108 on the inside of the housing 102. An over-travel wrap-up clutch 103 ensures that when the carrier 86 locks into synchronization with the small gear 84, the inertia of the centrifugal brake (weights 104) cannot be transmitted back to the small gear 84.

It may thus be seen that when the weights 104 are rotating below a critical speed, there will be little if any friction with the inner surface 108. However, when the speed of rotation rises above the critical speed, the resulting sliding contact between the weights 104 and housing will produce a large frictional drag opposing the rotation of the weights. This frictional drag will impose a rotary movement force on the carrier 86, causing it to rotate with the gear 84. At the same time, however, the high speed of the motor 22 is not imposed suddenly on the carrier 86 and the transducer drum 28, so that the rotary elements of the transceiver 12 (especially the transducers 30 and 36) are not depreciated or misaligned by the shock of a sudden start every time they are used.

Whenever the second drive path is not operating on the carrier 86 and the carrier 86 is free to rotate relative to the gears 82 and 84, the drive gear 84 will rotate the pinion 94 and gear 96. The gear 96 will then rotate the clutch gear 100 which rotates the disk 99 and weights 104 of the centrifugal clutch 98. Whenever the gear 84 is turning at the synchronous speed of the rotor 80 the centrifugal weights 104 will be driven at a speed that is greater than their critical speed, so that they will be forced out against the surface 108. The resultant frictional drag in the clutch 98 will impose a torque that will cause the pinion 94 and shaft 92 to be rotated relative to the control axis 26–81 of the clutch by the small drive gear 84. This in turn will cause the carrier 86 to rotate at a gradually increasing speed with the drive gears 82 and 84. The gear ratios in the first drive path and the spring 106 tensions in the centrifugal clutch 98 are designed so as to drive the carrier 86 at a speed that differs from the speed at which the drive gear 84 or motor is rotating. By way of example, the carrier 86 may be rotating at a slower speed which is on the order of 90% of the angular velocity of the gear drive 84. Thus a point on the carrier 86 or cylindrical wall 88 will tend to drop back from a corresponding point on the gear 82 as they both rotate. In other words, it may be seen that whenever the carrier 86 is rotating at a slower speed under the influence of the first drive path the phase relationship or orientation between the carrier 86 and the large gear 82 will change slowly. Since the large drive gear 82 is running at the synchronous speed, the phase relation of the yoke 26 and the turntable 28 will be very near to but gradually lagging behind the synchronous position.

In summary, the first drive path between the clutch input shaft 81 and the carrier 86 comprises the gear 84, the pinion 94, the gear 96, and the slipping clutch 98. When the transceiver set motor 22 is first turned on, the gear 84 quickly rotates at full angular velocity but the carrier 86 is permitted to increase speed at a more gradual rate because it is engaged with the gear 84 only frictionally, through the clutch 98, and even then only after the inertia of the weights 104 has been overcome sufficiently to rotate them at critical speed and move them out into contact with the surface 108 against the bias of the springs 106. The first drive path performs this gradual acceleration function immediately after turn-on of the transceiver set 12 and until such time as the second drive path becomes fully operative to rotate the carrier 86 at exactly the same angular velocity as the input shaft 81 and gears 82 and 84.

The second drive path is effective to directly connect the large drive gear 82 (sometimes referred to as the index gear) with the carrier 86 so that they will rotate locked together and thus maintain a constant phase between the large gear 82 and the carrier 86 without any slippage. In the present embodiment of the instant invention, the second drive path includes double-dog mechanism or actuator 110 which is mounted coaxial with the drive gears 82 and 84 and the carrier 86 and which operates to achieve a rigid connection between the gear 82 and the cylindrical wall 88, so that the angular velocity and phase orientation of the input shaft 81 and the yoke 26 will remain the same. The inner end of the double-dog mechanism 110 includes a bearing 111 (in FIGURE 3) which may be disposed on either side of the gear 82 and is rotatably mounted on a hub coaxial with the drive gears 82 and 84, so that the actuator "free-wheels" or idles on the input shaft 81. The mechanism 110 includes an arm 112 that projects outwardly toward the rim 90 of the carrier 86.

A pair of dogs or pawls 114 and 116, best seen in FIGURES 3 and 6, are pivotally mounted at 113 on the outer end of the arm 112 so as to be carried thereby. The first pawl 114 includes a contact edge or point 118 which in the embodiment of FIGURE 3 is shown wedge-shaped, while in a different version in FIGURE 6 is shown as a pin. In either case, in the movement of the pawl 114 the contact edge 118 reaches two extreme positions. In the first position, the edge or pin 118 fits between a pair of adjacent teeth 120 on the gear 82 and locks the pawl 114 and thus the entire actuator 110 to the drive gear 82. In the second position, the edge or pin 118 is lifted clear of the teeth 120. The gear 82 will then be free to rotate relative to the actuator 110 and also to the carrier 86. A spring 115 is connected between the pawl 114 and the actuator 110 so as to resiliently bias the pawl 114 into the first position, i.e., with its contact edge 118 locked between the teeth 120 and the gear 82.

The second pawl 116 is also pivotally mounted to move between two extreme positions: a first position wherein its contact point 124 is engaged with the cylindrical wall 88 and a second, disengaged position. An ear 122 on the pawl 116 is adapted to ride on the first pawl 114 and a spring 117 biases the pawl 116 so that the ear 122 moves toward the first pawl 114. Thus, whenever the first pawl 114 moves into its second (or unengaged) position, the second pawl 116 will be forced into its second position.

The end of the second pawl 116 includes the contact edge or pin 124 which is positioned to ride on a front rim 90 of the cylindrical wall 88. One or two detent mechanisms 128 are provided on the rim 90 to catch and hold to the edge 124 and thus lock the pawl 116 to the carrier 86. (Since the transducers 36 on the drum 28 are identical and receive the same input signals, their performance will not be altered by a 180° phase shift back or forward. On the other hand, the use of two detent mechanisms 128 reduces the "hunting" or first drive path distance and time by half.)

When the first pawl 114 moves into the first position (shown by the cross-hatched lines in FIGURE 11) it will be locked onto the gear drive 82 and will rotate therewith. Whenever the first pawl 114 is in this engaged position, the ear 122 will ride down to the bias of the spring 117 so that the contact edge 124 will ride against the cylindrical wall 88 and be arrested by which ever one of the detent mechanisms 128 it first comes to.

It may be seen that when the first pawl 114 is locked to the gear 82 and the second pawl 116 is locked to the cylindrical wall 88 on the carrier 86, the second drive path will cause the carrier 86 to rotate at the same speed as the gear 82 and thus a constant phase orientation will be maintained therebetween.

In the practice of the instant invention, the pawl 114 may be shifted between its engaged and disengaged positions by any number of suitable means. However, in the preferred practice shown, a solenoid 130 is mounted in a fixed position adjacent the speed-reducing gears 74. An armature 134 (sometimes called herein the dog or pawl lifter arm) is pivotally mounted as at 131 adjacent the solenoid 130 and includes a portion that is disposed adjacent the solenoid core or winding 132. The armature 134 also includes a portion that projects toward the rim 90 of the carrier 86.

When the solenoid 130 is not energized, a spring 135 can pull the armature 134 into the connect position shown in FIGURE 11(a). However, when the solenoid 130 is energized, the armature 134 is moved upward into the disconnect position shown in FIGURE 11(b). The connect and disconnect positions are so named to indicate the function of the armature 134 and its flange 136 which can engage the end of the first pawl 114 when the armature 134 is raised by the solenoid 130.

In the connect position shown in FIGURE 11(a), the solenoid 130 is not energized, the armature 134 is lowered, and the pin 118 may pass over the armature 134. This permits the spring 115 to pull the pawl 114 down so that the pin 118 engages a tooth 120 of the gear 82. This also permits the spring 117 to pull the pawl 116 so that its pin 124 engages the detent 128 in the carrier 86. Hence, the gear 82 is rigidly connected to the carrier 86 through the actuator 110 by the second path.

In the disconnect position shown in FIGURE 11(b), the solenoid 130 is energized and the armature 134 is raised. It may be noted in FIGURE 11(b) that the flange 136 on the end of the armature 134 is inclined. In the disconnect position when the armature 130 is energized and when the actuator 110 is rotating with the gear 82, the pin 118 on the pawl 114 will engage the inclined flange 136 and be lifted upward so that the pin 118 is removed from the tooth 120. The ear 122 moves the pawl 116 into the disconnect position. In the disconnect position, the pin 124 on the pawl 116 is removed from the detent 128. This serves to disconnect the actuator 110 from the drive gear 82 and the carrier 86 so that no force is applied to the actuator 110 other than that provided by the flange 136. This force from the flange 136 tends to retain the actuator 110 in a fixed position. Because the pin 118 on the pawl 114 cannot climb over and pass beyond the inclined flange 136 in the raised position, energization of the solenoid 130 causes the actuator 110 to be stopped in some exact position, such as the vertical position shown in FIGURE 11(b). At the same time, the carrier 86 will be disconnected from the drive gear 82 and will be driven by the first drive path.

The mechanical gating system of the instant invention has a far quicker "hunting" or phase orientation time than any other prior art systems because the flange 136 (FIGURE 11) (or whatever disengaging device is used in performing the invention) not only "closes the gate" but also arrests and holds the actuator 110 in readiness in the precise position it should be in when the gate opens briefly, i.e., when the solenoid 130 is de-energized briefly to let the pawls 114 and 116 engage. Upon de-energization of the solenoid 130 in response to a signal from the transmit-mode transceiver 12, the pawl 114 will lock to the gear 82 in proper orientation with the transmitting transmit-mode transducer 30. Then it only remains for the clutch to operate in the first drive path until the pawl 116 has slid along the rim 90 into one of the detents 128 for the receive-mode transducer 36 to be locked in phase.

To be more explicit, in order to use the present facsimile system 10 for transmitting and reproducing a copy of an original document, communications are first established between the two stations by means of a commercially-available telephone system. The transceiver 12 at the originating location is placed in the transmit mode. The transceiver 12 will then be arranged similar to the transceiver in the upper half of FIGURE 1. The original document is disposed on the platen 18. At the same time, the transceiver 12 at the remote location is placed in the receive mode so as to be arranged similar to the transceiver in the bottom of FIGURE 1. A blank piece of copypaper is placed on this platen 18.

As soon as the transmitting and receiving operators have indicated their respective units are ready, the handsets 52 and 58 of the telephones 54 and 60 are placed on the couplers 50 and 56. The transmitting and receiving units will then be connected together for the passage of electrical signals, and the motor 22 in the transmitting unit and the motor 22 in the receiving unit are started. The switches 44 and 72 in the two units are of the time delay variety and will cause the two units to initially pass through a synchronizing period. During the synchronizing period, the clutch 24 in the transmitting unit will be locked up and the yoke 26 will be driven at the synchronous speed.

A backstroke switch 137 is mounted on the frame 20 so as to be responsive to the passage of an actuator 139 carried by the rotating yoke 26 [see schematic of FIGURE 5(a)]. The switch 137 will be effective to cause the baseband signal to be continuous during synchronizing except during the backstroke of the pickup transducers 30. The baseband signal will be frequency modulated onto the carrier by the modulator 46. The frequency-modulated signal will then travel through the coupler 50, telephone 54 and telephone transmission line 14 to the receiver.

The frequency modulated signal will then travel through the telephone 60, coupler 56, equalizer 62 and limiter-amplifier filter 64 to the frequency demodulator 66. The demodulator 66 will remove the baseband signal from the carrier and provide a continuous signal that is changed only when the transmitter pickup transducers 30 are passing through the backstroke (that is to say, in the short interval when one tranducer 30 has just left off scanning while the other transducer 30 has not yet begun scanning). Also, the change in the otherwise continuous signal can be used as an interval in time when another signal (from the backstroke switch 137 or some analogous device) can be transmitted to provide a synchronizing time reference. This signal will then be frequency-modulated at 46, transmitted through the phone lines 14, be frequency modulated at 66, and ultimately travel through the delay switch 72 to a relay or electronic switch 138 which controls the solenoid 130. As long as the black signal continues, the print amplifier 350 will maintain the solenoid 130 energized so that the mechanical gate will be closed. However, in the short intervals when the signal becomes "white," the print amplifier 350 will de-energize the solenoid 130 to let the pawls 114 and 116 remain engaged if they pass at that time or to release them if they are being held by the flange 136.

Figure 11:
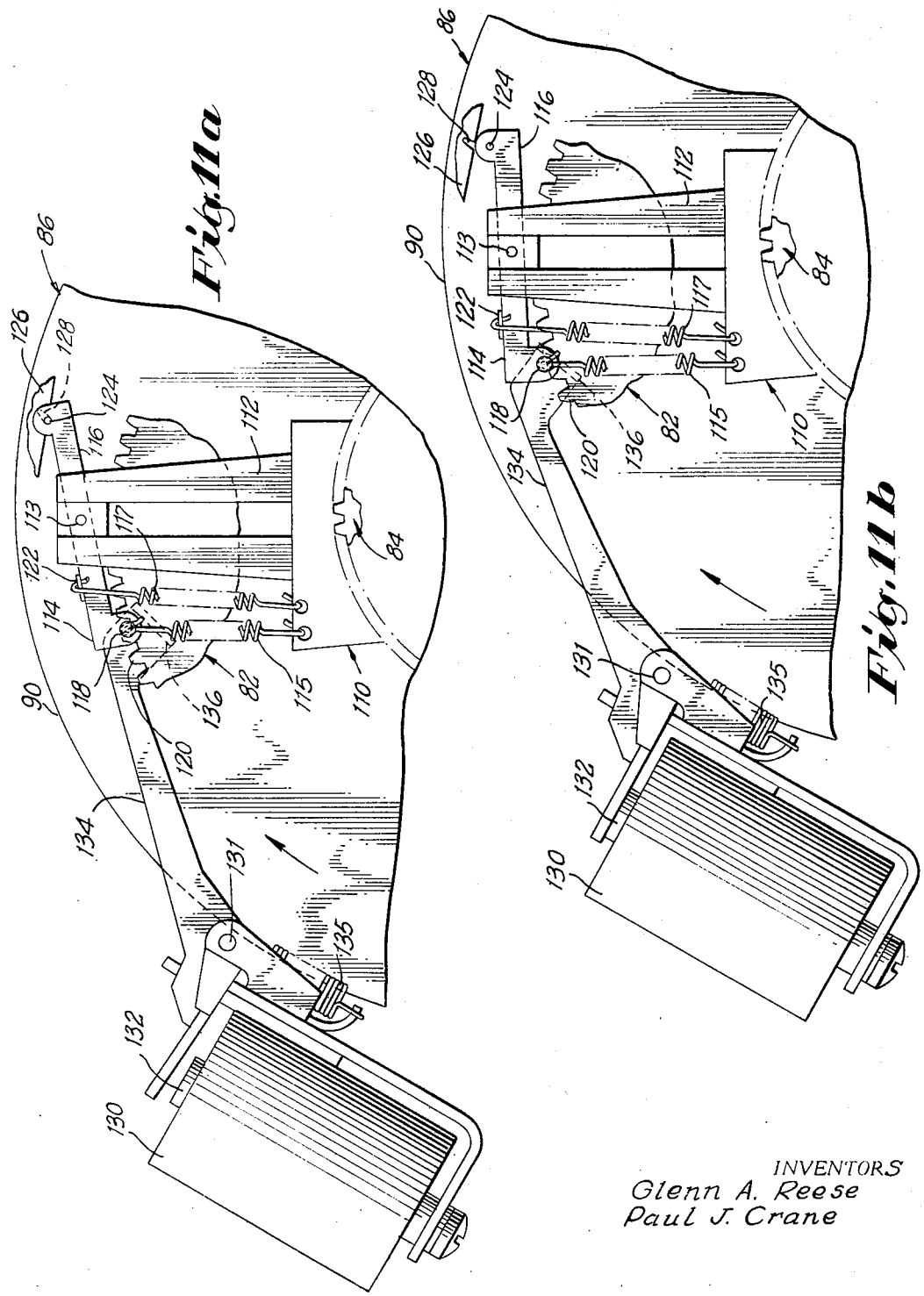

When the solenoid 130 is energized, the armature 134 will move into a first position shown in FIGURE 11(b). If the first pawl 114 is attached to the drive gear 82, it will be rotating with the drive gear 82. When the actuator 110 moves into the vertical position (FIGURE 11), the first pawl 114 will engage the flange 136 on the end of the armature 134. This will cause both the first and second pawls 114 and 116 to rotate into a second position shown in FIGURE 11(b). This will lift the first pin 118 out of engagement with the gear 82 and the second pin 124 out of engagement with the detent slot 128 on the carrier 86. The actuator 110 will now be retained in the vertical position and the carrier 186 will be free to rotate relative to the large drive gear 82.

The second drive path will now be disconnected and the torque from the motor 22 will be transmitted through the speed-reducing first drive path described above. The centrifugal clutch 98 will immediately run above the critical speed. The weights 104 will thus engage the inside of the housing and produce a large drag. The first drive path will then drive the carrier 86 at a speed other than the synchronous speed. In the present instance, this speed is about 90% of the synchronous speed. The yoke 86 in the receiving unit will now be rotating at about 90% of the speed of the yoke 26 in the transmitting unit. As a consequence, the phase relation of the printing transducers 36 on the receiver yoke 26 will gradually retrogress to that of the pickup transducers 30 on the transmitting yoke 26.

During each backstroke on the transmitting unit the "black" signal will momentarily cease. When this occurs, the print amplifier 350 will de-energize the solenoid 130 and release the armature 134. This will immediately release the first pawl 114 and cause the pin 118 to drop between a pair of teeth 120 on the large drive gear 82. As shown in FIGURE 11(a), this will lock the actuator 110 to the drive gear 82 whereby it will rotate with the drive gear 82.

At the moment the pawl 114 is dropped, since the solenoid 130 is momentarily de-energized in synchronism with the operation of the transmitting unit, i.e., during the backstroke of the pickup transducers 30, the actuator 110 will be locked in the rotating drive gear 82 in synchronism with the transmitting unit. During this interval, the carrier 86 is being driven by the first branch and is rotating slightly slower than the drive gear 82 and the actuator 110 rotating therewith. As a consequence, the pin 124 on the second pawl 116 will be "hunting" by sliding around the inner edge of the flange 126 and gradually retrogressing toward one of the detent slots 128 on the carrier 86. As explained above, if the pawl 114 engages the gear 82 in proper phase relationship with the transmit-mode yoke 26, either detent slot 128 will lock the receive-mode yoke 26 in proper phase relationship with the transmit-mode drum 28 once the pawl 116 is locked thereto. It should be noted that proper phase relationship between transmitter and receiver yokes is 90° apart.

It should be noted that the solenoid 130 will be continuously energized and the end of the ear 122 maintained in the elevated position so as to engage the pawl 114 except during the backstroke interval. If the actuator 110 is in a synchronized position, the solenoid 130 will be de-energized and the armature 134 lowered just as the actuator 110 passes through the vertical position. As a consequence, the pawl 114 will never engage the armature 134 and the position of the actuator 110 will not be altered.

However, if the actuator 110 is not locked to the gear 82 in a properly synchronized position, the actuator 110 will pass through the vertical position at a time when the solenoid 130 is still energized. As a result, the end of the armature 134 will engage the end of the pawl 114. This will disconnect the pawl 114 from the drive gear 82 and retain it in the vertical position until the next backstroke signal arrives. At that time, the solenoid 130 will be de-energized and the actuator 110 will again be locked onto the drive gear 82. In short, the clutch of the instant invention performs a mechanical operation similar to electronic "gating." In this mechanical gating operation, the favorable orientation of the carrier 86 and gear 82 is "gated through," while unfavorable orientations are not only disengaged, but also arrested at the gate to be dropped into engagement in the next possible favorable orientation. The differentiation between "favorable" and "unfavorable" is based on the simultaneous or "in-phase" arrival of the actuator 139 and the double-dog mechanism 110 at the switch 137 and solenoid 130, respectively.

It can be seen that the foregoing process will continue until such time as the mechanism 110 has become properly locked onto the drive gear 82 in a synchronized phase relationship. Once the actuator 110 is properly locked up, the retrogression of the carrier 86 will proceed until the pin 124 on the pawl 116 eventually becomes engaged in one of the detent slots 128 on the carrier 86.

At this point, the carrier 86 will be locked to the drive gear 82 and will rotate at the synchronized speed and in a synchronized position.

Just prior to the pin 124 dropping into the slot 128, the carrier 86 is rotating at about 90% of the speed of the drive gear 82. As a consequence, when the pin 124 drops into position and lockup occurs, there will be a minimum amount of impact or shock loading that might possibly disturb the phase relationships, adjustments, or operability of any portions of the receiving unit.

As soon as the lockup occurs, the first drive path will cause the centrifugal clutch 98 to rotate at a speed that is below the level where the centrifugal weights 104 swing outwardly. They will thus be retained in a non-frictional position by the tension of the springs 106, so that the first drive branch will be disconnected and will not interfere with the rotation of the carrier 86 by the large drive gear 82.

At the end of the synchronizing phase, normally an interval of about 10 to 20 seconds, the delay switches 44 and 72 in the receiving and transmitting units will change from their "synchronize" mode to regular "transmit" and "receive," so that the pickup transducers 30 in the transmitter will begin transmitting the video signals and printing transducers 36 in the receiving unit will begin producing a facsimile of the document. Since the drive motors 22 are of the synchronous type and derive their drive signals from essentially the same controls, they will continue to operate on a synchronous basis so that the operation of the receiver will thereafter be synchronized with the operation of the transmitter.

Referring to FIGURE 5a, that part of the electrical system of the transducer 12 which is concerned with the operation of the phasing clutch of the instant invention has as one feature the use in both transmit mode (top of FIGURE 5a) and receive mode (bottom of FIGURE 5a) of many of the same components. Moreover, some of these components are used also in other parts of the system, so that further economies are effected. A single thermal delay switch 300 serves to provide about 15 to 20 seconds of time for transmitter and receiver phase orientation before a transceiver set 12 actually begins to transmit or receive. The first terminal 302 of the thermal delay switch 300 is grounded while the second terminal 304 is connected through the windings 306 of a relay 308 to a power supply line 310 coming from a drive amplifier 312 which is connected to power the scan motor 72. The scan motor amplifier 312 is initially started on signal from a starting control circuit 314 in each transceiver 12.

The relay 308, through the mechanical connection shown by the dotted lines 316, throws three different movable contacts 320, 330 and 340 between two different sets of poles: 322 and 324 associated with the movable slide 320, 332, and 334 associated with the movable slide 330, and 342 and 344 associated with the movable slide 340. The movable slide 320 is directly coupled to ground, while the pole 322 is connected to the winding 306 and the pole 324 is connected to a heating resistor 326 in the thermal delay switch 300.

When the poles 320–340 are in the position shown in FIGURE 5a, the transceiver sets 12 which are to perform transmitting and receiving are connected to achieve phase orientation amongst themselves. During this phasing period, which as stated above should be about 15 to 20 seconds, power from the terminal 310 flows through the heating resistor 326 and through the movable contact 320 to ground. On the other hand, a movable contact 328 in each thermal delay switch 300 remains open until the critical amount of heat is generated by the resistor 326. At this point the contact 328 closes, causing current from 310 to pass through the relay winding 306. When current passes through the winding 306, energizing the relay 308, the armature 316 is caused to throw the poles 320, 330, and 340 into their down position (not shown herein).

The down position of the poles 320–340 is that appropriate for transmission and receiving of fascimile signals by the transceiver sets 12. In this position the movable contact 320 is closed to the pole 322, so that this switch serves as a holding circuit for the solenoid 308. That is to say, current from 310 is kept running through the winding 306 to the movable contact 320 and thus to ground, so that the solenoid 308 is kept energized and the movable contacts 320–340 are kept in their down or transmit-mode position.

In a transmit-mode transceiver 12, the electrical connections which are switched by the solenoid 308 are centered about the movable contact 330 and poles 332 and 324; while the movable contact 340 and poles 342 and 344 are used in receive-mode transceivers. Accordingly, the pole 332 is connected to receive signals from the document scan system of the transceiver set 12. The pole 334, on the other hand, being the pole which the movable contact 330 is in contact with when the solenoid 308 is deenergized, which is to say—during the phase-mode period, receives a steady voltage signal which is the equivalent of "black," as far as the scanning and printing portions of the transceiver set are concerned. The movable slide 330 is then connected through a current limiting resistor 336 to the FM modulator 46 where the signal from the movable slide 330 is frequency-modulated for transmission to the phone lines 14 to the FM receiver demodulator 66 of a receive-mode transceive-mode set 12.

The yoke 26 which is rotated by the scan motor 32 of each transceiver set 12 has mounted on it two backstroke magnets 139. The backstroke magnets 139 trigger a backstroke switch 137 twice in each revolution of the yoke 26. As shown in the transmit-mode portion of FIGURE 5a, the backstroke switch 137 is connected between the resistor 336 and ground. The backstroke switch 137 is normally open, but when a backstroke magnet 139 passes it, it momentarily closes to ground the input to the FM modulator 46. This grounding will, of course, prevent the transmission of the black equivalent voltage signals, instead transmitting the equivalent of "white."

At the FM receiver 66 of the receive-mode transceiver sets, the transmission through the phone line 14 during the phase orientation mode of operation will be demodulated to provide a voltage signal that is capable of energizing the clutch solenoid 130. Because of the effect of the backstroke magnets 139 and the backstroke switch 137 in grounding the black equivalent voltage every half revolution of the yoke 26, this solenoid energization signal will be interrupted twice every revolution of the transmit-mode yoke 26. The output of the FM receiver demodulator 66 is amplified at 350 and applied to the movable slide 340. During the 15 to 20-second phase mode period the movable slide 340 is connected to the pole 344 which is directly connected to the clutch solenoid 130. In the printing mode of the relay 308, the movable slide 340 is closed to the pole 342 which directs signals to the print transducer 36 of the transceiver set. Since the backstroke magnets 139 are placed such that they pass the backstroke switch 137 just as the print transducers 36 are at the beginning and end of their scans, the signal interruptions created by the backstroke switch 137 normally would not show up on the reproduced copy of a receive-mode transceiver 12.

When the relay 308 is in its unenergized state, so that the movable slide 340 is closed to the pole 344, the signals from the amplifier 350 will pass to the clutch solenoid 330. As discussed above, the armature 134 of the solenoid is biased such that when the solenoid 130 is not energized the flange 136 at the end of the armature 134 will not lift the pawls 114 and 116 out of engagement. On the other hand, when the solenoid 130 is energized, the armature 134 will raise to position the flange 136 at such a point that it will engage the pawl 114. When the pawl 114 is engaged it not only lifts out of its own engagement with the gear 82, but it also lifts the pawl 116 out of its engagement with the carrier 86. Thus it can be seen that the effect of the black equivalent voltage when applied to the pole 344 is to cause the clutch solenoid 130 to raise its armature so that the pawls 114 and 116 will be disengaged if they pass by. The effect of the periodic interruptions of the black equivalent voltage by the transmitter backstroke switch 137 will be to periodically de-energize the solenoid 130. Thus de-energization will permit the bias on the armature 134 to remove the flange 136 from the position where it would engage the pawl 114.

The operation of the system shown in FIGURE 5(a) is explained in detail in U.S. application, Ser. No. 537,177 filed Mar. 24, 1966 on behalf of Paul J. Crane entitled "Readiness Monitoring System" which in turn is a continuation-in-part of Ser. No. 488,459 (now abandoned) filed Sept. 20, 1965 entitled "Readiness Monitoring System." To begin with, the transmit-mode transceiver 12 begins to function when the start control 314 signals both the scan motor amplifier 312 and the FM modulator 46 to turn on. Thereupon the scan motor 32 begins to rotate, imparting rotation to the yoke 26. At the same time the thermal switch 300 begins to build up heat due to the passage of current through its resistor 326. However, since the movable slide 328 of the thermal switch 300 will remain in the open position until the heat buildup has proceeded to a certain critical point (a time lapse of about 15 to 20 seconds) the solenoid 308 will be in its de-energized position so that the black equivalent voltage on the pole 342 will be coupled into the FM modulator 46 and transmitted through the phone line 14 to receive-mode transceivers. As described above, this transmission of the black equivalent voltage will be interrupted twice for every revolution of the yoke 26 due to the passage of the backstroke magnets 139 past the backstroke switch 137.

After about 15 to 20 seconds of operation in the synchronization mode, the thermal switch movable contact 328 will close, causing current to flow from a scan motor amplifier 312 through coil 308 to ground. This current, of course, will pass through the windings 306 of the solenoid 308 causing the armature 316 to be pulled down so that the movable contacts 320, 330 and 340 are closed to the lower contacts 322, 332, and 342, respectively. This ends the synchronization mode of the transmit-mode transceiver and begins actual transmission, since the movable contact 330 will be connected to receive signals from the document scan components. The solenoid 308 is held in the transmit-mode by the connection of the power source 310 through the winding 306 to ground through the pole 322 and movable slide 320 which is closed thereto in the transmit mode. The switching of the movable slide 320 also means that no current can flow to ground through the resistor 326 so that once the synchronization mode period is ended the thermal switch 300 can immediately begin cooling off to be ready for another transmission.

Once the start control 314 turns off the transmit-mode transceiver 12, the scan motor amplifier 312 no longer supplies power through the winding 306, so that the solenoid 308 is de-energized and the armature returns to its de-energized state; that is to say, with the movable contacts 320, 330, and 340 in the position shown in FIGURE 5a. It should be recognized that this is the position that they will need to assume upon the beginning of another transmission operation. At the time that the scan motor amplifier is turned off by the start control 314, of course, the scan motor 32 is no longer energized and it and the yoke 26 cease rotation. At the same time the start control 314 turns off the FM modulator 46 so that it no longer frequency modulates and couples into the phone line 14 the signals applied to its input line 337.

In the receive-mode transceiver 12 [depicted in the bottom half of FIGURE 5(a)] the start control circuitry 314 also activates the amplifier 312 which, among other things, supplies power through the line 310. As in the transmit mode, this power first flows through the heating resistor 326 to ground and begins the twenty-second synchronization mode timing of the thermal switch 300. The scan motor 312 also begins the rotation of the motor 32 in the receive mode. The yoke 26 is accelerated through the first drive path of the phasing clutch of the instant invention; that is to say, through the gear 84 which is rotating with the motor 22. As the carrier 86 is brought up to an angular velocity just short of the angular velocity of the motor 22, the solenoid 130 begins its gating action as described in detail above under the influence of the electrical signals received from the transmit-mode transceiver 12 and demodulated at 66. During the 15 to 20-second synchronization mode period, these signals are directed through the movable contact 340 to the clutch 130 to cause it to interrupt the connection of the pawl 114 at all times except when one of the backstroke magnets 139 has momentarily closed the backstroke switch 137 to ground the black-equivalent voltage pole 334 and prevent transmission of the black-equivalent voltage by the modulator 46. As discussed above, this results in the pawl 114 being permitted to permanetly engage the large gear wheel 82 only in that position which will put the yoke 26 of the receive-mode transceiver 12 in phase orientation with the yoke 26 of the transmit-mode transceiver 12.

When the receive-mode thermal delay switch 300 has passed through sufficient time period to close the movable contact 328, the relay 308 is energized by current flow through its winding 306 from the line 310. Thus the movable slides 320, 330, and 340 are closed to their down position (not shown herein) and the receive-mode relay is held energized by current flow from 310 through the winding 306 through the movable contact 320 to ground. At the same time, the movable slide 340 is closed to the pole 342 with the result that all signals arriving thereafter from the print power amplifier 350 are directed to the printing transducers 36 rather than to the clutch solenoid 130. Since the solenoid 130 is no longer receiving any signals, its armature 134 reverts to the bias position wherein the flange 136 is held out of engagement with the passing pawl 114.

Since the movable slide 320 is no longer closed to the pole 324, current can no longer flow from 310 through the heating resistor 326 to ground. Thus, the thermal switch can begin to cool so that if the start control 314 should turn off the scan motor 312 and de-energize the solenoid 308, the thermal switch 300 would be ready to cause another 15 to 20-second delay when the scan motor amplifier 312 is again activated.

Using the above-described electrical system features of the instant invention and the coperating mechanical features described heretofore provides great improvements not found in the prior art. For example, it should be noted that no feedback from the receive-mode transceiver 12 to the transmit-mode transceiver 12 is provided for or needed. In facsimile transmission this is very important, since on some occasions more than one receive-mode transceiver might be receiving from the same transmit-mode transceiver 12. Moreover, the absence of feedback loops in facsimile transmission using one telephone line is almost a necessity because of the limited band width of the telephone line and the fact that signals are already passing in the transmit to receive direction. Moreover, the elimination of sampling, feedback and such complicated electrical functions makes it possible to use a very simple circuit, as the schematic diagram of FIGURE 5(a) will readily demonstrate.

Figure 5B:
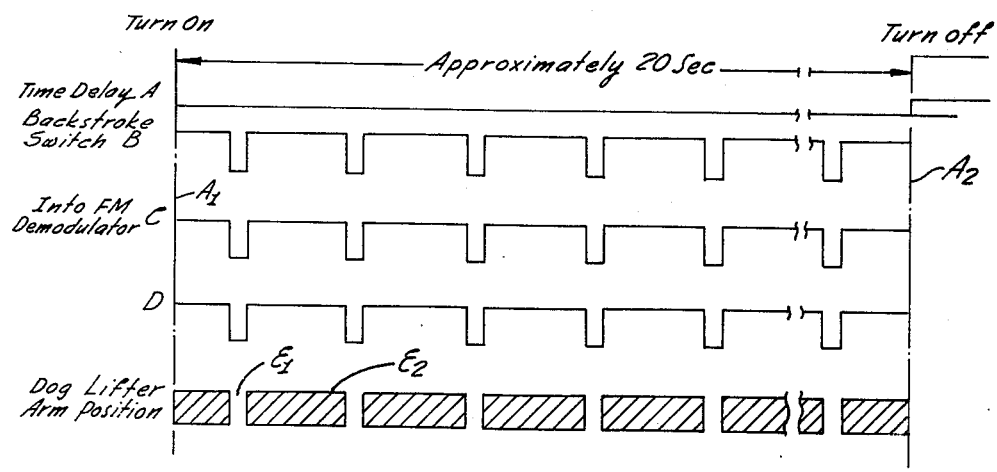
FIGURE 5(b) is a graph showing performance of the elements represented in FIGURE 5(a).

Referring to FIGURE 5(b), the graphs there show voltages at various points in the circuitry shown schematically in FIGURE 5(a) beginning at the turn-on time ($A_1$) of the facsimile transceiver 12 and proceeding through to the time that the time delay switches 300 discontinue operation of the system of the instant invention. The waveform A represents the signal appearing through the solenoid winding 306 of both the transmit-mode and the receive-mode transceivers 12, which must be present to maintain the switch contacts 320–340 in their "phase synchronization mode" position. The waveform B represents the output of the backstroke switch 137 and can be seen to be a grounding pulse which occurs whenever the actuator 139 passes the backstroke switch 137. The pulses B interrupt the black-equivalent signal from 342 as represented by the waveform C, which represents the synchronization phase input to the FM modulator 46.

In the receive-mode transceiver during the synchronization period, the output of the demodulator 66 is a pulse D similar to pulses B and C above and in phase therewith. This pulse D is connected to the terminal 344 as long as the time delay switch 300 keeps the slide 340 in contact therewith. The result is that such a pulse-form D de-energizes the solenoid 130 and causes the lifter flange 136 to be removed from the path of the dog 114 for a short time period marked $E_1$. At all other times the flange 136 will be held in a position where it will lift the dogs 114 and 116 out of contact with the gear teeth 120 of the large gear wheel 82 and this disconnects the second drive path of the phasing clutch of FIGURES 3 and 6. These potential "disconnect" periods are represented by the cross-hatched areas $E_2$ in FIGURE 5(b).

The overall effect of the electrical system of FIGURE 5(a), therefore, is to perform exact phase orientation of the receive-mode yoke 26 with the transmit-mode yoke 26 by forcing the receive-mode clutch to return to its first drive path until such time as it has entered its second drive path in proper phase with its transmit-mode yoke 26. The necessity of this in-phase relationship is apparent from the fact that the "disengage" position $E_2$ of the dog lifter flange 136 covers all time periods except that signalled by the backstroke switch 137 as being in phase. Although the receive-mode transceiver 12 has the first 20 seconds of time delay in which to "hunt" for its proper in-phase position, it has been found in practice that it usually falls into this position after once contacting the flange 136. The reason for this immediate phase orientation will be explained below in connection with FIGURES 12 and 13.

Figure 8:
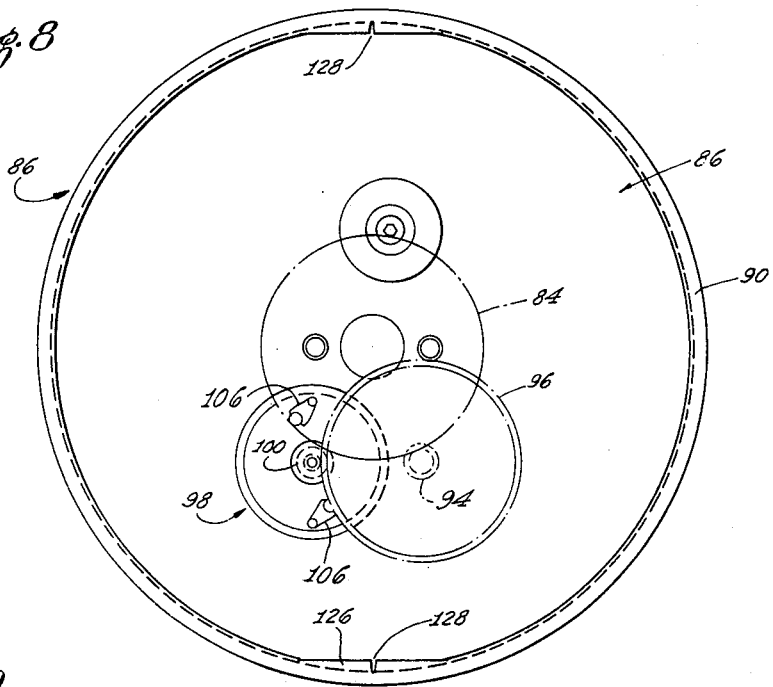
FIGURE 8 is a front elevation of the back part of the mechanism shown in FIGURE 6.
Figure 9:
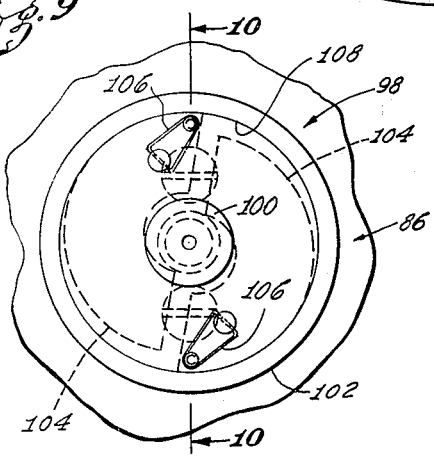
FIGURE 9 is a detail view of a portion of FIGURE 8.
Figure 10:
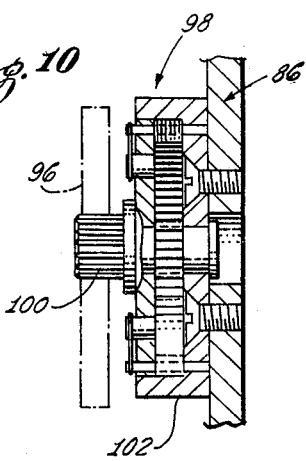
FIGURE 10 is a side elevation in cutaway of the apparatus of FIGURE 9.

Referring to FIGURES 6 and 7, the embodiment of the phasing clutch of the instant invention shown therein differs somewhat from the first embodiment illustrated in connection with FIGURES 3 and 4. For one thing, the double-dog mechanism 110 is mounted between the gear wheels 82 and 84 rather than forward on the gear wheel 82 as in the embodiment of FIGURE 3. Moreover, the contact edges 118, 124 of the two dogs 114 and 116 are pins, rather than the wedges shown in FIGURE 3. The pin 118 readily fits between the teeth 120 of the large gear wheel 82, whereas the pin 124 fits most readily into a dentent 128 of the sort illustrated in FIGURE 8.

Referring to FIGURES 12 and 13, the detailed views there are intended to illustrate the performance and interaction of the double-dog mechanism 110 and the solenoid 130. In FIGURE 12 the solenoid 130 is shown in the position that it would take during the time period $E_1$ when the backstroke switch 137 is actuated by the passage of its actuator 139. At that time the solenoid is temporarily de-energized, so that the arm 134 associated with the solenoid 130 is free to be pulled back by the spring 135 against a stop 200. The stop 200 is mounted on a threaded shaft 202 which passes through a bearing 204 on a portion 206 of the fixed, non-rotating structure of the transceiver 12. A hand knob 208 permits rotation of the shaft 202 to thread it through the bearing 204 for purposes of adjusting the stop 200 for proper backward travel of the arm 134. It can be seen that when the arm 134 is pulled back against the stop 200 the contact edge 118 of the pawl 114 is pulled into position between the teeth 120 of the main gear wheel 82 by the biasing spring 115.

This will lock the actuating mechanism 110 and the gear wheel 82 together, forcing them to rotate at the same angular velocity and phase orientation.

FIGURE 13 shows in dashed lines the position of the arm 134 during the backstroke intervals $E_1$ and in solid lines the position of the arm 134 during the "gate-closed" periods $E_2$ (according to the notation discussed in connection with FIGURE 5). In the "gate-closed" position $E_2$ a cam surface 210 on the underside of the arm 134 contacts a pin 212 protruding from the pawl assembly 114, 116. Force from the cam surface 210 on the pin 212 tends to rotate the pawls clockwise about their mounting pin 113 on the arm 112. This clockwise rotation, of course, would lift the contact edges 118 and 124 out of their respective engagements with the gear wheel 82 and detent mechanism 128, respectively, so that the second drive path of the clutch of the instant invention is no longer operative and the clutch reverts to the first or 90% speed drive path.

Whenever the pin 212 is forced into contact with the cam surface 210 the actuator assembly becomes free of rotary force applied through the large gear wheel 82. This freedom of rotation is used to advantage according to the invention by providing a sufficiently high ramp on the armature 134 to catch and hold the assembly 110 until such time as the solenoid 130 receives an electrical signal causing it to return the arm 134 to the position $E_1$. As explained above, this electrical signal is the synchronizing signal from the backstroke switch 137 which arrives at the precise "open-gate" time necessary to have the receive-mode yoke 26 rotate in phase orientation with the transmit-mode yoke 26.

Thus the solenoid arm 134 drops the pawl 114 into contact with the gear wheel 82 in the proper position for phase-oriented rotation of the carrier 86 and the york 26 affixed thereto whenever one of the detents 128 on the carrier 86 catches the contact edge 124 of the second pawl 116. It is because of this mechanical interaction that the instant invention is able to provide not only an "open-gate" to favorable orientation of the gear wheel 82 and the carrier 86 while barring all unfavorable orientations, but is also able to arrest the interconnecting mechanism 110 between the gear wheel 82 and the carrier 86 in an unengaged position until the precise moment for dropping into contact with the gear wheel 82 in position for phase-oriented interconnection to be made.

In summary, it can be seen that the instant invention provides a great and useful improvement over many prior synchronizing means, which depended on pre-start alignment to get some proximation phase orientation during operation. Such a system is far too inaccurate for good facsimile transmission work, even with synchronous drive motors accelerating two very lightweight members. After the rotating structures 26 carrying the transducers 30 and 36 in both the transmitting and receiving units have been accelerated to operating speed, the prior method offered no way of finding out whether the transmitting and receiving structures 26 are locked in proper phase relation with each other. Also, there were no means to correct any phase error that may have occurred if the rotating structures 26 in one or both of the units somehow become displaced timewise. It will thus be seen that although the prior art synchronization systems were capable of adequately performing their intended function, the instant invention will increase precision capabilities by its more accurate synchronization developed beyond the above-described limitations of the prior art.

The present invention provides means for synchronizing two or more devices without the foregoing disadvantages or limitations. The means are particularly adapted for accelerating a pair of rotating structures such as the yoke 26 employed in facsimile transmitting and receiving units up to their operating speeds and locking them in synchronous operation. As stated above, the present invention comprehends a facsimile transceiver 12 that may operate in either a transmit mode or a receive mode.

When the transceiver 12 is ready to operate in a transmit mode, it initially passes through a synchronizing phase during which it transmits a reference or synchronizing signal that is responsive to the position of the pickup transducers. The receiving unit passes through a synchronizing phase at the same time as the transmitting unit. During this phase, it is responsive to the reference signal from the backstroke switch 37 or the like and repeatedly repositions the reproducing transducers 36 until they are accurately synchronized with the transmitting transducers 30 and remain synchronized therewith. This is accomplished by providing the transceiver 12 with a synchronizing clutch having two separate drive paths. One path drives the printing transducers 36 at the synchronous reproducing speed, while the other path drives the printing transducers at a slightly different speed whereby the phase relation of the printing transducers 36 will gradually change. The solenoid-controlled actuator 110 in the clutch selects which of the drive paths is operative.

The solenoid 130 is responsive to the synchronizing signals D of FIGURE 5(b) from the transmitting unit 12 and repositions the actuator 110 each time a synchronizing signal is received if the actuator is not already disposed in the synchronized position. Each time the actuator 110 is repositioned into the synchronized position, it will allow the printing transducers 36 to run at the nonsynchronized speed until it also reaches a synchronized position. When the printing transducers 36 do reach the synchronized position relative to the transducers 30, the actuator 110 will cause the clutch of the instant invenion to commence driving the printing transducers 36 at the synchronized speed so as to be ready for producing a facsimile. Throughout the synchronizing phase $A_1$–$A_2$, the actuator 110 will be continuously responsive to the synchronizing signal D; and if for some reason the printing transducers 36 are not initially properly synchronized, they will be continually repositioned until they do become properly synchronized and remain synchronized.

The above-disclosed phasing system is a great advance over the prior art in that it provides a phasing accuracy which is limited only by the number of teeth on the large gear wheel 82, yet does not use a feedback system or any extra electronics which would increase the expense and vulnerability to breakdown of the system. Moreover, even with these advances, the phasing clutch performs far more quickly than would a samplying system as discussed above and has the added advantage of minimizing shock by bringing the rotating element up to a speed just short of its synchronized rotary velocity before attempting synchronization. As the accompanying figures show, a synchronization system according to the instant invention can be built very simply and inexpensively, yet it is far more durable and reliable than the more expensive apparatus and electronics heretofore used.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

We claim as our invention:

1. In combination in a facsimile system for establishing phase orientation between the rotations of a transmit-mode facsimile transceiver drum and a receive-mode facsimile transceiver drum.

a first electric motor mechanically connected to rotate the transmit-mode facsimile transceiver drum, first means mounted to rotate with the transmit-mode facsimile transceiver drum for providing an indication of the phase orientation of the transmit-mode facsimile drum, second means mounted adjacent the path of the rotation of the first means for sensing the passage of the first means and deriving electrical signal therefrom, said electrical signals being representative of the phase orientation of the transmit-mode facsimile transceiver drum, a second electric motor for driving the receive-mode facsimile transceiver drum, said electric motor having the characteristics of producing a rotation of identical angular velocity to the rotation of the first electric motor, an indexing gear mounted to rotate with the second electric motor, teeth about the periphery of the index gear, a second gear mounted to rotate with the second electric motor, teeth about the periphery of the second gear, a carrier wheel mounted to rotate with the receive-mode facsimile transceiver drum to be driven by the second electric motor, a cylindrical rim on the carrier wheel extending forward from the carrier wheel to surround the index gear and the second gear, an actuator arm mounted to rotate freely coaxially with the index gear and the second gear and extended beyond the periphery of the index gear, a first pawl mounted pivotally on the actuator arm and spring-biased to lock to the teeth on the index gear, a second pawl mounted pivotally on the actuator arm and mechanically connected to the first pawl in such manner that when the first pawl locks itself to the index gear the second pawl will be urged outward toward the rim of the carrier wheel, a detent mounted on the rim of the carrier wheel in such position as to lock the carrier wheel to the second pawl when the second pawl is urged outward by locking of the first pawl to the teeth of the index gear, a pinion gear mounted to the carrier wheel off center from the axis of rotation thereof, said pinion gear being so positioned as to mesh with the teeth on the periphery of the second gear, a third gear wheel mounted to rotate with the pinion gear on the carrier, a clutch mounted on the carrier wheel and rotationally interconnected with the third gear wheel in such manner that as the third gear wheel increases its angular velocity the clutch will impede the rotation of the third gear wheel, a solenoid electrically connected to the second means and having a solenoid arm mounted adjacent the index gear, said solenoid arm being adapted to lift the first pawl out of connection with the teeth on the index gear, and said solenoid being adapted to cause the solenoid arm to keep the first pawl disconnected from the index gear except at such time as its connection would provide phase orientation between the transmit-mode facsimile transceiver drum and the receive-mode facsimile transceiver drum to be driven by the second electric motor as soon as the second pawl becomes locked to the detent.

2. In combination for establishing phase orientation between a rotary drive shaft and a rotating device to be driven by the rotary drive shaft, an indexing gear mounted to rotate with the rotary drive shaft, teeth about the periphery of the indexing gear, a second gear mounted to rotate with the rotary drive shaft, teeth about the periphery of the second gear, a carrier wheel mounted to rotate with the rotating device to be driven by the rotary drive shaft, a cylindrical rim on the carrier wheel extending forward from the carrier wheel to surround the index gear and the second gear, an actuator arm mounted to rotate freely about the rotary drive shaft and extended beyond the periphery of the index gear, a first pawl mounted pivotally on the actuator arm and spring-biased to lock to the teeth on the index gear, a first pawl mounted pivotally on the actuator arm and spring-biased to lock to the teeth on the index gear, a second pawl mounted pivotally on the actuator arm and mechanically connected to the first pawl in such manner that when the first pawl locks itself to the index wheel the second pawl will be urged outward toward the rim of the carrier wheel, a detent mounted on the rim of the carrier wheel in such position as to lock the carrier wheel to the second pawl when the second pawl is urged outward by locking of the first pawl to the teeth of the index gear, a pinion gear mounted to the carrier wheel off center from the axis of rotation thereof, said pinion gear being so positioned as to mesh with the teeth on the periphery of the second gear, a third gear wheel mounted to rotate with the pinion gear on the carrier, a clutch mounted on the carrier wheel and rotationally interconnected with the third gear wheel in such manner that as the third gear wheel increases its angular velocity the clutch will impede the rotation of the third gear wheel, a solenoid having electrical input terminals and a solenoid arm mounted adjacent the index gear wheel, said solenoid arm being adapted to lift the first pawl out of connection with the teeth on the index gear wheel, and a source of electrical signals electrically connected to the input terminals of the solenoid and adapted to cause the solenoid arm to keep the first pawl disconnected from the index drive wheel except at such time as its connection would provide phase orientation between the rotary drive shaft and the rotating device to be driven by the rotary drive shaft as soon as the second pawl became locked to the detent.

3. In combination for establishing phase orientation between the rotation of a first rotating device and a second rotating device, a first electric motor mechanically connected to rotate the first rotating device, first means mounted to rotate with the first rotating device for providing an indication of the phase orientation of the first rotating device, second means mounted adjacent the path of the rotation of the first means for sensing the rotation of the first means past the second means and deriving electrical signals therefrom, said electrical signals being representative of the phase orientation of the first rotating device, a second electric motor for driving the second rotating device, said second electric motor having the characteristics of producing a rotation of identical angular velocity to the rotation of the first electric motor, and third means operatively associated with the second electric motor and the second rotating device and electrically connected to the second means to receive the electrical signals derived by the second means for mechanically coupling into a locked relationship the second electric motor and the second rotating means in response to the electrical signals in such manner that the second rotating device is rotated by the second electric motor in phase orientation with the first rotating device.

4. The combination according to claim 3 with the addition of fourth means for imparting rotational force from the second electric motor to the second rotating device prior to creation of the locked relationship between the second electric motor and the second rotating device by the third means, said fourth means being constructed such that the annular velocity imparted by it to the second rotating device differs from the angular velocity imparted by the third means so that the phase orientation between the second rotating device and the second electric motor can be shifted prior to the creation of the locked relationship by the third means.

5. In combination for establishing phase orientation between the rotations of a first rotating device and a second rotating device,
 a first electric motor mechanicaly connected to rotate the first rotating device,
 first means mounted to rotate with the first rotating device for providing an indication of the phase orientation of the first rotating device,
 second means mounted adjacent the path of rotation of the first means for sensing the rotation of the first means past the second means and deriving electrical signals therefrom, said electrical signals being representative of the prase orientation of the first rotating device,
 a second electric motor for driving the second rotating device, said second electric motor having the characteristic of producing a rotation of identical angular velocity to the rotation of the first electric motor,
 third means mounted to rotate with the second electric motor,
 fourth means mounted to rotate with the second rotating device,
 fifth means operatively associated with the third and fourth means for interconecting the third means and the fourth means in locked relationship so that they rotate together, and
 sixth means electrically connected to the second means for responding to electrical signals from the second means by actuating the fifth means to enter a locked relationship with the third and fourth means at a time when phase orientation between the first rotating device and the second rotating device will be established.

6. In combination for establishing a desired phase orientation between a rotary drive shaft and a rotating device to be driven by the rotary drive shaft,
 an index disk mounted to rotate with the rotary drive shaft,
 a carrier disk mounted to rotate with the rotating device to be driven by the rotary drive shaft,
 interlocking means mounted proximate to the carrier disk and the index disk for placing the carrier disk and the indexing gear in a locked relationship so that they rotate together,
 biasing means for urging the interlocking means toward a position resulting in a locked relationship between the carrier and the index disk, and
 gating means for interrupting the locked relationship of the carrier and the index disk except at times when the desired phase orientation between the rotary drive shaft and the rotary device is satisfactorily established.

7. The combination according to claim 6 with the addition of startup means for imparting rotational force from the rotary drive shaft to the rotating device prior to creation of the locked relationship between the carrier disk and the index disk by the interlocking means,
 said startup means operating to ensure that the angular velocity of the rotating device differs from the angular velocity of the rotary drive shaft so that the phase orientation betwen the carrier disk and the index disk can be shifted prior to creation of the locked relationship by the interlocking means.

8. In combination for establishing phase orientation between the rotations of a first rotating device and a second rotating device,
 a first electric motor mechanicaly connected to rotate the first rotating device,
 first means mounted to rotate with the first rotating device for providing an indication of the phase orientation of the first rotating device,
 second means mounted adjacent the path of rotation of the first means for sensing the passage of the first means and deriving electrical signals therefrom, said electrical signals being representative of the phase orientation of the first rotating device,
 a second electric motor for driving the second rotating device, said second electric motor having the characteristic of producing a rotation of identical angular velocity to the rotation of the first electric motor,
 a gear wheel mounted to be rotated by the second electric motor, said gear wheel having gear teeth on the periphery thereof,
 a disk mounted to impart rotatory motion to the second rotating means,
 an actuator arm mounted to rotate freely in proximity to the disk and gear wheel and coaxial therewith,
 third means mounted on the actuator arm adapted to move into and out of contact with the teeth of the gear wheel and when contacting said teeth to lock the actuator arm to the gear wheel to rotate therewith,
 fourth means electrically connected to the second means for moving the third means into and out of contact with the teeth of the gear wheel in response to the electrical signals from the second means, and
 fifth means operatively associated with the actuator arm and the disk for locking the disk to the actuator arm so that it rotates therewith in such relation that the second rotating device is rotated by the disk in phase orientation with the first rotating device.

9. In combination for establishing phase orientation between the rotations of a first rotating device and a second rotating device.
 a first electric motor mechanically connected to rotate the first rotating device,
 first means for providing electrical signals indicative of the phase orientation of the first rotating device,
 a second electric motor for driving the second rotating device, said second electric motor having the characteristic of producing a rotation of identical angular velocity to the rotation of the first electric motor,
 a gear wheel mounted to be rotated by the second electric motor, said gear wheel having gear teeth on the periphery thereof,
 second means mounted to impart rotary motion to the second rotating means,
 an actuator arm mounted to rotate freely in proximity to the second means and the gear wheel and coaxial therewith,
 third means mounted on the actuator arm and adapted to move into and out of contact with the teeth of the gear wheel and when contacting said teeth to lock the actuator arm to the gear wheel to rotate therewith,
 fourth means electrically connected to the first means for moving the third means into and out of contact with the teeth of the gear wheel in response to the electrical signals from the first means, and
 fifth means operatively associated with the actuator arm and the second means for locking the second means to the actuator arm so that it rotates therewith in such relation that the second rotating device is rotated by the second means in phase orientation with the first rotating device.

10. The combination according to claim 9 with the additional specifications that the second means has an orientation point thereon and the second means is so constructed that the fifth means will lock only that point to the actuator arm, and that the electrical signals from the first means cause the fourth means to move the third means into contact with the teeth of the gear wheel only at that point on the gear wheel which will produce phase orientation between the first rotating device and the second rotating device once the fifth means has locked the orientation point on the second means to the actuator arm.

11. In combination for establishing a desired phase orientation between a rotary drive shaft and a rotating device to be driven by the rotary drive shaft, an index disk mounted to rotate with the rotary drive shaft, gear teeth around the periphery of the index disk, a carrier disk mounted to rotate with the rotating device to be driven by the rotary drive shaft, a detent mounted on the carrier disk, interlocking means mounted proximate to the carrier disk and the index disk for locking into the detention the carrier disk and also locking between teeth on the indexing gear to provide a locked relationship so that the index disk and the carrier disk must rotate together, means for urging the interlocking means toward a position resulting in a locked relationship between the carrier and the index disk, and means for interrupting the locked relationship of the carrier and the index disk except at times when the desired phase orientation between the rotary drive shaft and the rotary device is satisfactorily established.

12. The combination described in claim 11 in which the means for interrupting the locked relationship of the carrier and the index disk is a contact surface extending into the path of rotation of the interlocking means.

13. The combination described in claim 11 in which the means for interrupting the locked relationship of the carrier and the index disk is a contact surface extending into the path of rotation of the interlocking means and said contact surface is removable from the path of rotation of the interlocking means in response to an electrical signal.

14. In combination for establishing phase orientation between the rotations of a first rotating device and a second rotating device, a first electric motor mechanically connected to rotate the first rotating device, first means mounted to rotate with the first rotating device for providing an indication of the phase orientation of the first rotating device, second means mounted adjacent the path of rotation of the first means for sensing the passage of the first means and deriving electrical signals therefrom, said electrical signals being representative of the phase orientation of the first rotating device, a second electric motor for driving the second rotating device, said second electric motor having the characteristics of producing a rotation of identical angular velocity to the rotation of the first electric motor, an index disk mounted to rotate with the second electric motor, gear teeth around the periphery of the index disk, a carrier disk mounted to rotate with the second rotating device to be driven by the rotary drive shaft, a detent mounted on the carrier disk, interlocking means mounted proximate to the carrier disk and the index disk for locking into the detention the carrier disk and also locking between teeth on the indexing gear to provide a locked relationship so that the index disk and the carrier disk must rotate together, means for urging the interlocking means toward a position resulting in a locked relationship between the carrier and the index disk, and means for interrupting the locked relationship of the carrier and the index disk except at times when the desired phase orientation between the rotary drive shaft and the rotary device is satisfactorily established.

15. The combination described in claim 14 in which the means for interrupting the locked relationship of the carrier and the index disk is a contact surface extending into the path of rotation of the interlocking means.

16. In combination for use in a facsimile system including a transmitter at a first position for scanning a visual image and for transmitting signals representing information relating to the visual image and a receiver at a second position removed from the first position for receiving the signals representing the visual information and for scanning a document to reproduce the visual image from the received signals, means for producing a scan at a controlled rate at the transmitter, means coupled to the scanning means for producing a control signal at a frequency related to the scanning rate, means coupled to the scanning means for scanning the visual image at the transmitter to produce a signal representing the visual image, means for providing for the production of the control signal for only a limited period of time and for thereafter providing for a scanning of the visual image, means for obtaining a transmission of the control signal and the information signal from the first position to the second position, means for receiving the control signal and the information signal at the second position, means for producing a scan at a controlled rate at the receiver, means responsive to the control signal for varying the scanning operation of the scanning means at the receiver to synchronize the scanning operation of the scanning means at the receiver with the scanning operation of the scanning means at the transmitter, and means responsive to the information signal received at the receiver for reproducing the visual image at the receiver in accordance with the controlled rate of operation of the scanning means at the receiver.

17. In combination for use in a facsimile system including a transmitter at a first position for scanning a visual image and for transmitting signals representing information relating to the visual image and a receiver at a second position removed from the first position for receiving the signals representing the visual information and for scanning a document to reproduce the visual image from the received signals, first means for producing a scan at a controlled rate at the transmitter, second means coupled to the scanning means for periodically producing control signals for a limited period of time at a frequency related to the scanning rate of the first means, third means coupled to the second means for transmitting the control signals to the receiver at the second position, fourth means at the receiver for receiving the control signals, fifth means at the receiver for producing a scan at a variably controlled rate, sixth means at the receiver and operatively coupled to the fourth and fifth means for synchronizing the scanning operation of the fifth means with the scanning operations of the first means in accordance with the frequency at which the control signals are produced by the second means, seventh means at the transmitter and operative after the limited period of time for providing for a transmission of signals representing the visual image, and eighth means at the receiver and operative after the limited period of time for providing for the reproduction of the visual image in accordance with the characteristics of the signals transmitted to represent the visual image.

18. The combination set forth in claim 17 wherein the sixth means include a mechanical clutch having its operation controlled by the control signals to synchronize the fifth means with the first means.

19. The combination set forth in claim 17 wherein the seventh means is operative upon the second means to prevent the production of the signals by the second means after the limited period of time and wherein the eighth means are operative upon the sixth means after the limited period of time to prevent any further synchronizing action by the sixth means.

20. In combination for use in a facsimile system including a transmitter at a first position for scanning a visual image and for transmitting through a pair of telephone lines signals representing information relating to the visual image and a receiver at a second position removed from the first position for receiving through the pair of telephone lines the signals representing the visual image and for scanning a document to reproduce the visual image from the received signals, first means at the transmitter for providing a scanning at a controlled rate, second means at the transmitter for producing control signals for a limited period of time at a frequency dependent upon the scanning rate of the first means, third means at the transmitter and responsive to the operation of the second means for obtaining an interruption in the production of the control signals by the second means after the limited period of time, fourth means at the transmitter for obtaining the production of the information signals in accordance with the scanning by the first means after the limited period of time, fifth means at the transmitter for transmitting the control and information signals through the pair of telephone lines to the receiver, sixth means at the receiver for providing a scanning at a controlled rate, seventh means at the receiver for receiving the control and information signals transmitted through the pair of telephone lines, mechanical means at the receiver and responsive to the control signals for adjusting the operation of the sixth means in accordance with the reception of the control signals to synchronize the scanning rate of the sixth means with the scanning rate of the first means eighth means at the receiver and responsive to the operation of the mechanical means for obtaining an interruption in the synchronizing operation of the mechanical means after the limited period of time, and ninth means at the receiver for obtaining the reproduction of the visual image at the receiver in accordance with the characteristics of the information signals after the limited period of time.

21. The combination set forth in claim 20 wherein driving means drive the mechanical means and wherein the mechanical means are operative to produce a scanning by the sixth means at a rate slightly different from the scanning by the first means until the sixth means reach a particular position relative to the driving means and wherein the mechanical means are thereafter synchronized to the driving means.

22. In a facsimile system including a transmitter at a first position for scanning a visual image at a particular rate for a limited period of time to initially transmit control signals at a frequency related to the particular rate and after the limited period of time, to subsequently transmit signals representing information relating to the visual image in accordance with such scan, a receiver at a second position removed from the first position for receiving the control and information signals and for scanning a document to reproduce on the document the visual image from the received signals, including:

first means for providing a scan at a controlled rate different from the particular rate;

second means for receiving the control and information signals;

third means initially responsive to the control signals for adjusting the scanning rate of the first means in accordance with the frequency of the control signals to synchronize the scanning at the transmitter and the receiver;

fourth means responsive to the control signals for obtaining an interruption in the operation of the third means after the limited period of time; and fifth means responsive to the information signals, after the operation of the fourth means in interrupting the operation of the third means, for reproducing the image on the document in accordance with the characteristics of the information signals.

23. In a facsimile sytsem including a transmitter at a first position for scanning a visual image at a particular rate to initially transmit through a pair of telephone lines control signals for a limited period of time at a frequency related to the particular rate and to subsequently transmit signals representing information relating to the visual image in accordance with such scan, a receiver at a second position removed from the first position for receiving the control and information signals through the pair of telephone lines and for scanning a document to reproduce on the document the visual image from the recive of signals, including, first means at the receiver for providing a scan at a controlled rate different from the particular rate but variable to the particular rate, second means for responsive to the control and information signals passing through the pair of telephone lines for introducing these signals to the receiver, third means movable with the first means and having characteristics of being engaged to vary the scanning rate of the first means, fourth means responsive to the control signals for the limited period of time to move into engagement with the third means upon each reception of the control signals and to vary the scanning rate of the first means in accordance with the relative frequency of the control signals and the scanning rate of the first means to synchronize the scanning rate of the first means at the particular rate, fifth means responsive to the information signals after the limited period of time for operating upon such signals to reproduce the visual image on the document, and sixth means operative after the particular period of time for obtaining an activation of the fifth means and an interruption in the operation of the fourth means.

24. In combination for use in a facsimile system including a transmitter at a first position for scanning a visual image and for transmitting signals representing information relating to the visual image and a receiver at a second position removed from the first position for receiving the signals representing the visual information and for scanning a document to reproduce the visual image from the received signals, first means for providing a scan at a particular rate on a cyclic basis, second means operatively coupled to the first means for producing a control pulse each time the first means reaches a particular position in the scan, third means operatively coupled to the second means for obtaining a transmission of the control pulses from the transmitter to the receiver, fourth means at the receiver for receiving the control pulses, fifth means at the receiver for providing a scan at the particular rate on the cyclic basis, sixth means operatively coupled to the fifth means for movemetn with the fifth means and including first detent means, seventh means disposed in cooperative relationship with the sixth means and responsive to the control signals from the fourth means for providing slippage between the sixth and seventh means when the disposition of the seventh means at the occurrence of the control pulses does not correspond with a particular disposition of the second means at the transmitter at such occurrence, the seventh means including second detent means for engaging the first detent means to provide a synchronous movement between the fifth and seventh means, eighth means disposed in cooperative relationship with the fourth means for de-activating the seventh means when the disposition of the seventh means at the occurrence of the control pulses correspond with the particular disposition of the second means at the transmitter at such transmitter, and ninth means responsive to the operation of the eighth means in de-activating the seventh means for producing an engagement between the first and second detent means.

25. The combination set forth in claim 24 wherein tenth means are operatively coupled to the second means at the transmitter for producing signals representing information relating to the visual image after the production of the control signals for a particular period of time and in accordance with the scan by the first means and for obtaining the transmission of such information signals to the receiver and wherein eleventh means are included at the receiver for converting such information signals into the visual information on the document in accordance with the synchronous scan by the fourth and sixth means.

26. In combination for use in a facsimile system including a transmitter at a first position of scanning a visual image and for transmitting signals representing information relating to the visual image and a receiver at a second position removed from the first position for receiving the signals representing the visual information and for scanning a document to reproduce the visual image from the received signals, first means at the transmitter for providing a scanning at a particular rate on a cyclic basis, second means at the transmitter and operatively coupled to the first means for initially producing a control signal at a particular phase in each cycle of the scan, third means at the transmitter for producing signals having characteristics representing the visual image, fourth means at the transmitter and responsive to the production of the control signal for obtaining an interruption in the operation of the second means and an activation of the third means after a limited period of time, fifth means for obtaining a transmission of the control and information signals to the receiver, sixth means for receiving the control signal transmitted by the third means, seventh means at the receiver for providing a scanning at a variably controlled rate on a cyclic basis, eighth means responsive to the control signal from the sixth means and operatively coupled to the seventh means for adjusting the phase of the scanning by seventh means to coordinate the phase of the scanning by the seventh means with the phase of the scanning by the first means, ninth means operatively coupled to the eighth means for locking the eighth means to scan in synchronous relationship with the first means upon a coordination in the phase of the scanning by the seventh means with the phase of the scanning by the first means, tenth means responsive to the information signals received by the sixth means for obtaining a reproduction at the receiver of the visual image, and eleventh means at the receiver and responsive to the reception of the control signal for obtaining an interruption in the operation of the eighth means and an activation of the tenth means after the limited period of time.

27. The combination set forth in claim 26 wherein the eighth means include mechanical means responsive to a difference in phase between the first and seventh means for providing a scanning by the seventh means at a slightly different rate than the scanning by the first means until the phase of the scanning by the seventh means corresponds to the phase in the scanning by the first means.

28. In a facsimile system including a transmitter at a first position for scanning a particular image at a particular rate on a cyclic basis to initially transmit for a limited period of time control signals at a frequency related to the particular rate and to subsequently transmit, after the limited period of time, signals representing information relating to the visual information in accordance with such scan, a receiver at a second position removed from the first position for receiving the control and information signals and for scanning a document to reproduce on the document the visual image from the received signals, including, first means for providing a scan at the particular rate on the cyclic basis, second means operatively coupled to the first means for movement with the first means and including first detent means, third means for receiving the control and information signals from the transmitter, fourth means, including second detent means, disposed in cooperative relationship with the second means for movement and responsive to the control signals from the third means for providing a slippage of the fourth means relative to the second means when the control signals do not occur in synchronous relationship with a particular disposition of the fourth means, fifth means disposed in cooperative relationship with the second means and the fourth means for respectively engaging the first and second detent means to lock the fourth means to the second means for a synchronous movement of the fourth means with the second means when the control signals occur in synchronous relationship with the particular disposition of the fourth means, sixth means responsive to the information signals for obtaining a reproduction of the visual image at the receiver, and seventh means responsive to the control signals for de-activating the fourth means and activating the sixth means after the limited period of time.

29. In a facsimile system including a transmitter at a first position for scanning a particular image at a particular rate on a cyclic basis to initially transmit for a limited period of time control signals at a frequency related to the particular rate and to subsequently transmit, after the limited period of time, signals representing information relating to the visual information in accordance with each scan,
  a receiver at a second position removed from the first position for receiving the control and information signals and for scanning a document to reproduce on the document the visual image from the information signals, including,
  first means for providing a scan at the particular rate on a cyclic basis,
  second means for receiving the control and information signals from the transmitter,
  third means disposed in cooperative relationship with the first means and responsive to the control signals from the second means for providing a progressive slippage of the third means relative to the first means on a controlled basis to produce a synchronous relationship between the occurrence of the control signals in the successive cycles and a particular disposition of the third means,
  fourth means responsive to the synchronous relationship between the occurrence of the control signals in the successive cycles and the particular disposition of the third means for locking the third means to the first means for synchronous movement with the first means,
  fifth means responsive to the information signals for obtaining a reproduction of the visual image at the receiver, and
  sixth means operatively coupled to the third and fifth means for obtaining a deactivation of the third means and an operation of the fifth means after the limited period of time.

30. The combination set forth in claim 29 wherein the fourth means include detent means responsive to a disposition of the third means other than in the particular disposition at the time of occurrence of the control signals for providing for the progressive slippage of the third means relative to the first means in the limited period of time and further include means responsive to the particular disposition of the third means during the limited period of time for providing a deactivation of the detent means during such limited period.

References Cited
UNITED STATES PATENTS

| | | | |
|---|---|---|---|
| 2,464,618 | 3/1949 | Shonnard et al. | 178—69.5 |
| 2,630,495 | 3/1953 | Wise | 178—69.5 |
| 2,704,306 | 3/1955 | McFarlane et al. | 178—69.5 |
| 2,924,659 | 2/1960 | Cooley | 178—69.5 |
| 3,207,846 | 9/1965 | Murphy | 178—69.5 |
| 3,392,232 | 7/1968 | Cohen | 178—6 |

ROBERT L. GRIFFIN, Primary Examiner

R. L. RICHARDSON, Assistant Examiner